(12) United States Patent
Fernández Martínez

(10) Patent No.: US 8,688,616 B2
(45) Date of Patent: Apr. 1, 2014

(54) HIGH-DIMENSIONAL DATA ANALYSIS

(75) Inventor: Juan Luis Fernández Martínez, Oviedo (ES)

(73) Assignee: Blue Prism Technologies Pte. Ltd., Singapore (SG)

( * ) Notice: Subject to any disclaimer, the term of this patent is extended or adjusted under 35 U.S.C. 154(b) by 349 days.

(21) Appl. No.: 13/041,423

(22) Filed: Mar. 6, 2011

(65) Prior Publication Data

US 2011/0307438 A1 Dec. 15, 2011

Related U.S. Application Data

(60) Provisional application No. 61/354,685, filed on Jun. 14, 2010.

(51) Int. Cl.
*G06N 5/00* (2006.01)
(52) U.S. Cl.
USPC .......................................................... 706/52
(58) Field of Classification Search
None
See application file for complete search history.

(56) References Cited

PUBLICATIONS

Carreira-Perpinan, "Continuous Latent Variable Models for Dimensionality Reduction and Sequential Data Reconstruction", Phd Thesis from University of Sheffield, UK, Feb. 2001, pp. 1-312.*
Liu, Srivastava, Wang, "Intrinsic Generalization Analysis of Low Dimensional Representations", Neural Networks, vol. 16, 2003, pp. 537-545.*
Pardo-Iguzquiza, "Inference of Spatial Indicator Covariance Parameters by Maximum Likelihood Using MLREML", Computers & Geosciences, vol. 24, No. 5, 1998, pp. 453-464.*
Provost, Jensen, Oates, "Efficient Progressive Sampling", KDD-99 San Diego, CA, ACM 1999, pp. 23-32.*
Treves, "A Treasure Trove of Geometry and Analysis: The Hyperquadric", Notice of the AMS, vol. 47, No. 10, Nov 2000, pp. 1246-1256.*
Fernández Alvarez J.P, Fernández Martínez J.L, Menéndez Pérez C.O., Feasibility analysis of the use of binary genetic algorithms as importance samplers application to a 1-D DC resistivity inverse problem, 2008, pp. 375-408, Mathematical Geosciences.
Fernández Alvarez J.P, Fernández Martínez J.L, Menéndez Pérez C.O., A posteriori inference of model parameters in a geophysical inverse problem using G.A., Springer, 2004, vol. 77, pp. 709-716, ISBN 3-540-22264-2, Advances in Soft Computing, Soft Methodology and Random Information Systems.

(Continued)

*Primary Examiner* — Kakali Chaki
*Assistant Examiner* — Walter Hanchak
(74) *Attorney, Agent, or Firm* — Carmen S. Ng; Dexter K. Chin

(57) ABSTRACT

Described herein is a framework for analyzing data in high-dimensional space. In accordance with one implementation, observed data and at least one input model parameter set is received. The input model parameter set serves as a solution candidate of a predefined problem (e.g., inverse or optimization problem) and is related to the observed data via a model. To provide enhanced computational efficiency, a reduced base with lower dimensionality is determined based on the input model parameter set. The reduced base is associated with a set of coefficients, which represents the coordinates of any model parameter set in the reduced base. Sampling is performed within the reduced base to generate an output model parameter set in the reduced base. The output model parameter set is compatible with the input model parameter set and fits the observed data, via the model, within a predetermined threshold.

20 Claims, 18 Drawing Sheets

(56) References Cited

PUBLICATIONS

Fernández Martínez J.L, García Gonzalo E., The generalized PSO: a new door to PSO evolution, Journal of Artificial Evolution and Applications, Special Issue on Particle swarms: the second decade, 2008, 15 pages, Article ID 861275, DOI:10.1155/2008/861275.

Fernández Martínez J.L, García Gonzalo E., Fernández Alvarez J.P., Theoretical analysis of particle swarm trajectories through a mechanical analogy, International Journal of Computational Intelligence Research (IJCIR), Feature Issue on Particle Swarm Optimization, 2008, vol. 4-2, pp. 93-104.

Fernández Martínez J.L, García Gonzalo E., The PSO family: deduction, stochastic analysis and comparison, Swarm Intelligence, Special Issue on Particle Swarm, 2009, vol. 3, pp. 245-273.

Fernández Martínez J.L., Fernández Alvarez J.P., García Gonzalo M.E., Menéndez Pérez C.O., Kuzma, H.A, Particle Swarm Optimization (PSO): A simple and powerful algorithm family for geophysical inversion, SEG, SEG Technical Program Expanded Abstracts, 2008, vol. 27-1, pp. 3568-3571.

Tarantola A., Inverse Problem Theory and Model Parameter Estimation: SIAM, 2005.

* cited by examiner

206

HIGH-DIMENSIONAL DATA ANALYSIS

CROSS-REFERENCE TO RELATED APPLICATION

This application claims the benefit of U.S. Provisional Application No. 61/354,685, filed Jun. 14, 2010, which is hereby incorporated by reference in its entirety.

TECHNICAL FIELD

The present disclosure relates to data analysis and, more specifically, to systems and methods for analyzing data in high-dimensional space.

BACKGROUND

Inverse problems are often encountered in many fields of technology, including engineering, science and mathematics. Solving an inverse problem entails the determination of certain model parameters from a set of observed data or measurements. The mapping of data to model parameters is a result of interactions within a physical system, such as the Earth, atmosphere, gravity, and so forth. For example, in the field of geophysics, geologic model parameters (e.g., conductivity, density, magnetic permeability, porosity, seismic velocity, etc.) are typically identified from some projections that are acquired on the surface of the earth (i.e. observed data) and are related to the model parameters through a forward model.

More precisely, an inverse problem may be formulated as follows:

$$F(m) \approx d \quad (1)$$

where $m=(m_1, m_2, \ldots, m_n) \in M \subset R^n$ denotes a model parameter set that belongs to a set or family of admissible model parameters M, $d \in R^s$ represents the observed data, and $F(m) = (f_1(m), f_2(m), \ldots, f_s(m))$ represents the forward model that predicts the observed data.

However, as in any inverse problem, there is not one unique solution. Inverse problems are commonly ill-posed; that is, different kinds of model parameter sets can be used to predict the observed data with the same precision. This is due to some degree of uncertainty or inaccuracy that is inherent in most data observations. Uncertainty exists in inverse problems because of a variety of factors, such as poor data calibration, contamination and noise in data measurements, discrete data coverage, approximated physics and conceptualization, discretization of continuous inverse problems, linearization and numerical approximations, model physical assumptions (e.g., isotropy, homogeneity, anisotropy, etc.), limited bandwidth, poor resolution, and so forth.

Uncertainty may be defined as the difference between the one true value that describes a physical quantity at a specific point in time and space and the value reported as a result of a measurement. Estimation of uncertainty involves finding the family M of equivalent model parameter sets m that are consistent with the prior knowledge and fit the observed data $d \in R^s$ within a prescribed tolerance (tol), as follows:

$$\|F(m)-d\|_2 < tol \quad (2)$$

where $\|\ \|_2$ represents the Euclidean norm, but other norms can also be used.

Quantifying uncertainty is a key aspect in risk management, business analysis, probabilistic forecasting and many other business processes. Model-based applications that incorporate uncertainty evaluation capabilities can provide invaluable guidance in business decision-making, such as whether or not to acquire more data to reduce uncertainty or to proceed with the current path, or whether the potential reward that can be achieved in developing a set of assets is outweighed by the degree of risk and cost involved. For example, in the petrochemical field, the success of finding new oil and gas reserves can be significantly improved by evaluating the uncertainty of developing new leads.

Despite the importance of "measuring" uncertainty to access risk, however, little progress has been made in finding a robust method for estimating inverse problem model uncertainty, especially in parameter spaces with very high dimensionality and/or very costly forward evaluations. For example, Bayesian network-based frameworks have previously been used to estimate uncertainty. However, such frameworks are very inefficient, especially where the number of parameters is very large and/or the forward evaluations are very costly to compute. Sampling within a Bayesian framework incurs very high computational costs because it is performed in parts of the model space with very small likelihood of being consistent with the observed data. As such, these conventional methods are naturally limited to small parameterizations (i.e. low number of parameters) and fast forward solvers.

SUMMARY

Automated and semi-automated systems and methods for analyzing data in high-dimensional spaces are described herein. In accordance with one implementation, observed data and at least one input model parameter set is received. The input model parameter set serves as a solution candidate of a predefined problem (e.g., inverse or optimization problem) and is related to the observed data via a model. To provide enhanced computational efficiency, a reduced base with lower dimensionality is determined based on the input model parameter set. The reduced base is associated with a set of coefficients, which represents the coordinates of any model parameter set in the reduced base. Sampling is performed within the reduced base to generate an output model parameter set in the reduced base that is compatible with the input model parameter set and fits the observed data, via the model, within a predetermined threshold.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. The same numbers are used throughout the drawings to reference like elements and features.

DETAILED DESCRIPTION

Figure 1:
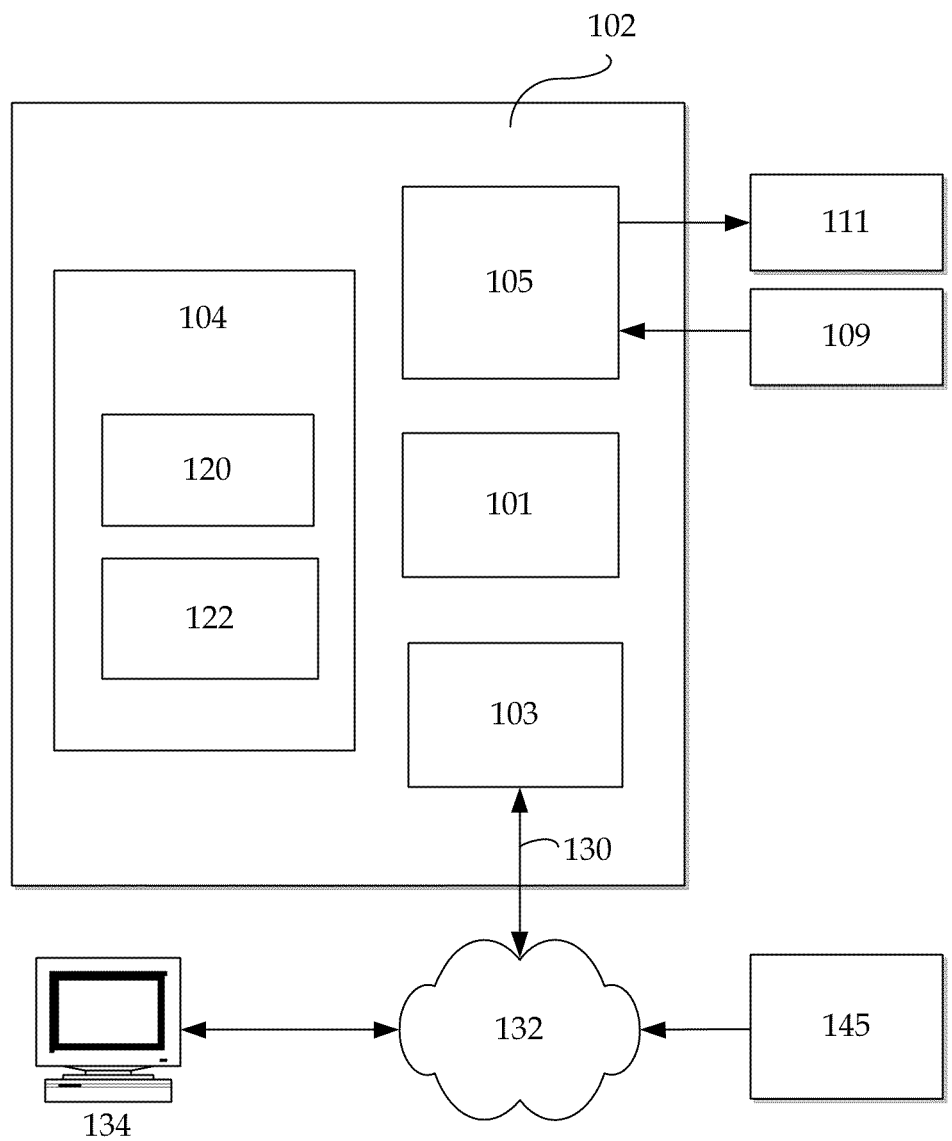
FIG. 1 shows an exemplary system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The following description sets forth one or more implementations of systems, devices and methods that facilitate automated or semi-automated analysis of digital data in high-dimensional space. In general, the present framework includes building a lower-dimensional reduced base over which sampling for equivalent models may be efficiently performed. The reduced base is associated with a smaller set of coefficients than the input model parameter set(s). The coefficients of the reduced base represent the coordinates of any model parameter set in the reduced base. The reduced base may be constructed using orthogonal transformations, other model reduction techniques or any combination thereof. The model reduction techniques include, but are not limited to, Singular Value Decomposition, Discrete Cosine Transform, Discrete Wavelet Transform, Discrete Chebyshev Transform, and Independent Component Analysis, Indicator-base (or set level base) technique, or Principal Component Analysis (PCA) using unconditional prior scenarios.

Once the reduced base is generated, sampling may be performed within the reduced base to generate one or more output model parameter sets that fit the observed data within a predetermined error tolerance and are compatible with the input model parameter set(s). Sampling techniques include, for example, geometric sampling (e.g., hyperprism sampling), oriented sampling, sampling while optimizing in the reduced base, stochastic sampling, or a combination thereof. The present framework also provides the flexibility of using other types of model parameterizations, such as logarithmic sampling, to better condition the sampling procedure. The orthogonal nature of the reduced base also allows high frequencies to be added in the sampling as needed, such as in telescopic sampling. The resulting output model parameter set may then be analyzed and used to construct various kinds of measures of interest, such as probability maps or uncertainty measures that are useful for risk analysis or other types of assessments.

Computational efficiency of the parameter search in the reduced base is greatly improved, because sampling can be performed within a model space of much lower dimensionality than the canonical base associated with the input model parameter set. In addition, unlike prior work, the present framework also provides for optimization in the reduced space, since it can decouple the sampling from the forward evaluations (e.g., model likelihood assessments) if desired. Model reduction also allows for the computation of the Jacobian and Hessian matrices, which are useful for representing the local shape of the valley of the misfit landscape in the reduced base. More details of these exemplary methods and systems will be provided in the following sections.

Introduction

The present framework casts the problem of estimating uncertainty in an optimization framework that makes use of the natural geometric and algebraic interpretation of the uncertainty problem. In particular, the present framework is based on the assertion that equivalent model parameter sets are located along flat elongated valleys of the misfit function landscape. A misfit function, as used herein, refers to any objective measure of the difference between predicted data and observed (or measured) data. The misfit function may also exhibit different local optima located in the different basins of the misfit function landscape. Such multimodality feature is prevalent in many inverse problems.

In other words, equivalent model parameter sets are locally associated with a hyperquadric of equivalence with axes that are oriented along the singular vectors of the local Jacobian operator (J) and dimensions that are proportional to the inverse of the eigenvalues. To prove this assertion, consider a model parameter set $m_0$ located in the low misfit region of the misfit function landscape. A Taylor series expansion of the forward function $F(m)$ centered at $m_0$ may be expressed as follows:

$$F(m) - F(m_0) \approx JF_{m_0}(m - m_0). \qquad (3)$$

Then $$F(m) - d = F(m_0) - d + JF_{m_0}(m - m_0) = \Delta d + JF_{m_0}(m - m_0), \qquad (4)$$

$$C(m) = \|F(m) - d\|_2^2 = \|\Delta d\|_2^2 + (m - m_0)^T JF_{m_0}^T JF_{m_0}(m - m_0) + 2\Delta d^T JF_{m_0}(m - m_0). \qquad (5)$$

Therefore $\|F(m) - d\|_2^2 = \text{tol}^2$ is the hyperquadric of the following equation:

$$(m - m_0)^T JF_{m_0}^T JF_{m_0}(m - m_0) + 2\Delta d^T JF_{m_0}(m - m_0) + \|\Delta d\|_2^2 = \text{tol}^2. \qquad (6)$$

Introducing the singular value decomposition of the Jacobian matrix $JF_{m_0} = U\Sigma V^T$, equation (6) transforms into:

$$\Delta m_{B_V}{}^T \Sigma^T \Sigma \Delta m_{B_V} + 2\Delta d_{B_U}{}^T \Sigma \Delta m_{B_V} + \|\Delta d\|_2^2 = \text{tol}^2, \quad (7)$$

where $\Delta m_{B_V}$ denotes the vector $(m - m_0)$ referred to as the base V and $\Delta d_{B_U}$ is the error data prediction $F(m_0) - d$ referred to as the base U.

The center of the hyperquadric coincides with the Gauss-Newton solution of the inverse problem. In fact, the Gauss-Newton method uses the Gauss-Newton approximation to the Hessian, $JF_{m_0}{}^T JF_{m_0}$, and the center of the hyperquadric coincides with one iteration of the Gauss-Newton method. Accordingly, Equation (7) may be simplified as follows:

$$\sum_{k=1}^{r} \left(\frac{\Delta m_k}{1/\lambda_k} + \Delta d_k\right)^2 + \sum_{k=r+1}^{s} (\Delta d_k)^2 = tol^2, \quad (8)$$

where $\Delta m_k$ and $\Delta d_k$ are respectively the components of $\Delta m_{B_V}$ and $\Delta d_{B_U}$ and r denotes the rank of the Jacobian $JF_{m_0}$, which is the number of singular values that are different from zero.

By examining the expression (8), it can be observed that the equivalent model parameter sets located locally from $m_0$ will have the direction of the vectors of the base V (right singular vectors of the Jacobian) and the axes are proportional to $1/\lambda_k$ in each $v_k$ direction. Along these directions, the data is insensitive to model variations if the inverse problem is linear. Therefore, it can be deduced that the low misfit equivalent region is defined by a valley shape around the components that belong to the null-space of $JF_{m_0}$, with the valley having an infinite length. This means that along these directions, the data is completely insensitive to model variations if the inverse problem was linear.

Finally, if the same analysis is performed on another equivalent model parameter set $m_1$ located in the neighbourhood of $m_0$, then $JF_{m_0} \rightarrow JF_{m_1}$. Based on the continuity of the Jacobian operator, this implies the orientations $V_{m_1} \rightarrow V_{m_0}$ and $\Sigma_{m_1} \rightarrow \Sigma_{m_0}$. This means that the equivalent region will have a global valley shape with axes and dimensions that vary locally according to the variation of V and $\Sigma$. The terms $\Delta d_k$ in the hyperquadric of equivalence may introduce localized sinkholes on the valley landscape.

Due to the semi-definite positive character of $JF_{m_0}{}^T JF_{m_0}$, the cost function landscape is locally either a hyper ellipsoid or an elliptical cylinder. The exact Hessian of the misfit function is $$HC(m_0) = JF_{m_0}^t JF_{m_0} + \sum_{k=1}^{s} (f_k(m_0) - d_k) Hf_k(m_0).$$

The term $$\sum_{k=1}^{s} (f_k(m_0) - d_k) Hf_k(m_0)$$

can provoke the exact Hessian of $C(m) = \|F(m) - d\|_2^2$ to lose the semi definite positive character of $JF_{m_0}{}^t JF_{m_0}$ and finally having an indefinite character. The nonlinearity of the forward operator causes the nonlinear equivalent regions to have a croissant or tube-like shape with either a finite or infinite length. In addition, different disconnected islands of low misfit (i.e. multimodality) may appear in the cost function landscape with sill points connecting different basins. Nonlinear equivalent regions of infinite length, embodied as meandering tubes in the model space, may be related to finite resolution issues of the forward model. For linear inverse problems, these valleys are straight and are related to the null space of the forward linear operator.

The analysis shown above for inverse problems is also valid for scalar optimization problems. A scalar optimization problem may be formulated as:

$$\min_{x \in R^n} E(x),$$

wherein $E(x): R^n \rightarrow R$ is an n-dimensional scalar field. Solving a scalar optimization problem includes finding the family of model parameters x that fulfils the condition $E(x) \leq \text{tol}$. Assuming a model parameter set $x_0: E(x_0) \leq \text{tol.}$, for any other model parameter set x in the neighbourhood of $x_0$, the Taylor expansion of the scalar misfit function $E(x)$ is as follows:

$$E(x) = \qquad\qquad\qquad (9)$$
$$E(x_0) + \langle \nabla E_{(x_0)}, x - x_0 \rangle + \frac{1}{2}(x - x_0)^t HE_{(x_0)}(x - x_0) + o(\|x - x_0\|^2),$$

where $HE_{(x_0)}$ denotes an n-dimensional Hessian matrix that contains curvature information (second order derivatives) of the scalar misfit function $E(x)$ in the neighbourhood of model parameter set $x_0$ and $\langle \bullet, \bullet \rangle$ represents the Euclidean scalar product. The matrix $HE_{(x_0)}$ is symmetric, and therefore, exhibits orthogonal diagonalization and can be decomposed into the following form:

$$HE_{(x_0)} = VDV^T, \; D = \begin{pmatrix} \Sigma_{(r,r)} & 0_{(r,n-r)} \\ 0_{(n-r,r)} & 0_{(n-r,n-r)} \end{pmatrix}, \quad (10)$$

where, in this case, V is a matrix composed of the eigenvectors of $HE_{(x_0)}$, D is the diagonal matrix constructed from the corresponding eigenvalues, $V^T$ is the inverse matrix of V, and $\Sigma_{(r,r)}$ contains the r non-null eigenvalues of D. The last n-r eigenvectors contained in V span the null space of the Hessian in $x_0$. Accordingly, the equation of the hyperquadric of equivalence is as follows:

$$\langle \nabla E_{(x_0)}, x \rangle + \frac{1}{2} x^t HE_{(x_0)} x - x_0^t HE_{(x_0)} x = \qquad (11)$$
$$tol - E(x_0) + \langle \nabla E_{(x_0)}, x_0 \rangle - \frac{1}{2} x_0^t HE_{(x_0)} x_0$$

Taking into account that:

$$\frac{1}{2} x^t HE_{(x_0)} x = \frac{1}{2} x^t VDV^t x = \frac{1}{2} x_V^t D x_V, \qquad (12)$$
$$x_0^t HE_{(x_0)} x = x_0^t VDV^t x = x_{0V}^t D x_V$$
$$\langle \nabla E_{(x_0)}, x \rangle = x^t \cdot \nabla E_{(x_0)} = x_V^t V^t \nabla E_{(x_0)} = \langle (\nabla E_{(x_0)})_V, x_V \rangle,$$

where $(\nabla E_{(x_0)})_V$ represents the gradient of E in $x_0$ referred to the V base. Then, the equation of the hyperquadric rotated to the principal axes is:

$$\langle (\nabla E_{(x_0)})_V, x_V \rangle + \frac{1}{2} x_V^t D x_V - x_{0V}^t D x_V = \quad (13)$$

$$tol - E(x_0) + \langle \nabla E_{(x_0)}, x_0 \rangle - \frac{1}{2} x_0^t H E_{(x_0)} x_0.$$

Depending on the rank of matrix $HE_{(x_0)}$ and the sign of its eigenvalues, the local hyperquadric of equivalence can change its type from ellipsoids (positive eigenvalues), hyperboloids (negative eigenvalues), or elliptical or hyperbolic cylinders (null eigenvalues). For cost functions built using the Euclidean norm of the data misfit (this is the case of the inverse problems), the Hessian may have a semi-definite positive character and the local hyperquadric is either an ellipsoid or an elliptical cylinder. As in the previous case, the centre of the hyperquadric coincides with the Gauss-Newton solution of the optimization problem when the input model is located in $x_0$.

Exemplary System

It is to be understood that embodiments of the present invention can be implemented in various forms of hardware, software, firmware, special purpose processes, or a combination thereof. In one embodiment, the present technology can be implemented in software as an application program tangibly embodied on a computer readable program storage device. The application program can be uploaded to, and executed by, a machine comprising any suitable architecture. The system and method of the present disclosure may be implemented in the form of a software application running on a computer system, for example, a laptop, personal computer (PC), workstation, client device, mini-computer, storage system, handheld computer, server, mainframe computer, dedicated digital appliance, and so forth. The software application may be stored on a non-transitory media locally accessible by the computer system and accessible via a hard wired or wireless connection to a network, for example, a local area network, or the Internet.

FIG. 1 shows an exemplary system 100 operable to implement a method and system of the present disclosure. The system 100 may include a computer system 102, which may be a server, a network of servers or resources, a desktop personal computer, a portable laptop computer, another portable device, a mini-computer, a mainframe computer, a storage system, a dedicated digital appliance, or another device having a storage sub-system configured to store a collection of digital data items. In one implementation, the computer system 102 includes a processor 101, a network controller 103, non-transitory computer-readable media 104, an input/output interface 105, one or more input devices 109 (e.g., keyboard, mouse, touch screen, tablet, etc), and one or more output devices 111 (e.g., monitor or display). Various other peripheral devices, such as an additional data storage device and a printing device, can also be connected to the computer system 102.

Non-transitory computer-readable media 104 can include random access memory (RAM), read only memory (ROM), magnetic floppy disk, disk drive, tape drive, flash memory, etc., or a combination thereof. The present invention may be implemented as a problem solver 120 and an uncertainty assessor 122 that includes computer-readable program code tangibly embodied in the non-transitory computer-readable media 104 and executed by the processor 101. As such, the computer system 102 is a general purpose computer system that becomes a specific purpose computer system when executing the routine of the present invention. The computer-readable program code is not intended to be limited to any particular programming language and implementation thereof. It will be appreciated that a variety of programming languages and coding thereof may be used to implement the teachings of the disclosure contained herein. The computer system 102 may also include an operating system and micro instruction code. The various processes and functions described herein can either be part of the micro instruction code or part of the application program or routine (or combination thereof) which is executed by the processor 101 via the operating system.

The computer system 102 may be connected, via network 132 using a communication link 130, to one or more client workstations 134 and data source 145. The communication link may be a telephone, a wireless network link, a wired network link, or a cable network. The network 132 may be wired or wireless, and may include a local area network (LAN), a wide area network (WAN), or a combination thereof. The client workstation 134 may include a computer and appropriate peripherals, such as a keyboard and display, and can be operated in conjunction with the entire system 100. For example, the client workstation 134 may further include a memory to store information (e.g., input model parameter sets, prior scenarios, data, forward model definitions, etc.) that defines the inverse or optimization problem to be solved by the computer system 102. The client workstation 134 may further include a user interface to allow a user (e.g., customer or client) to interactively manipulate the retrieved and/or processed data. For example, the user may specify the problem to be solved and provide instructions to the computer system 102.

In addition, the client workstation 134 may be communicatively coupled, via the network 132, with the data source 145 so that the data stored or collected by the data source 145 can be retrieved by the client workstation 134. Alternatively, the data source 145 may be incorporated in the client workstation 134 or the computer system 102. In one implementation, the data source 145 is a memory or other program storage device that stores digital observed data that can be used by the computer system 102 to predict model parameter sets. The data source 145 may also be a data acquisition system that is adapted to collect the digital observed data by quantifying observations of a physical system. For example, such digital observed data may be geophysical data, meteorological data or biomedical data. It should be understood that the present framework is not limited to data observed in a physical system. Non-physical systems, such as financial markets or business enterprises, may also be observed. For example, the observed data may include historical stock prices, commodity prices, currency values or other types of financial data collected for analyzing investment portfolios and predicting future performance. In addition, the observed data may be in any digital format, such as one-dimensional data or two- or three-dimensional images.

In one implementation, the data source 145 is a data acquisition system that includes a signal sensor, detector, receiver, source, scanner or any other suitable device that is operable to digitize observations (e.g., images) of a physical system (e.g., Earth, atmosphere, biological body, etc.). In geophysical exploration applications, the data acquisition system 145 may be adapted to collect geophysical data such as seismic reflection data that can be used to compute quantitative parameters (e.g., velocity structure, elastic parameters, etc.) of rock terrains via seismic inversion techniques. Such seismic reflection techniques are particularly useful in hydrocarbon exploration, where subsurface distribution of terrains and its structure are mapped to delineate and assess the likelihood of potential hydrocarbon accumulations or ore deposits in oil and gas exploration. Other types of data, such as electromagnetic, gravimetric, magnetic, electrical resistivity, electrical impedance data, historical production information, pressures for reservoir optimization or history matching, may also be used. Uncertainty in such data may exist due to, for example, partial coverage of the survey or measurement. For example, geophysical surveys may be incomplete because they are typically performed from the surface of the earth. Uncertainty may also be caused by noise introduced during data acquisition, such as instrumental noise, noise caused by error in the location of sources and receivers, and so forth.

It is understood that other types of observed data may also be collected by the data acquisition system 145 for different applications. For instance, in the medical field, biological data such as electrophysiological data or radiological images (e.g., magnetic resonance (MR) or computed tomography (CT) images) may be collected to detect abnormal medical conditions (e.g., tumor or malignant growths). In the meteorology field, weather forecasting may be performed based on meteorological data indicative of precipitation, temperature, humidity values, cloud coverage, air quality, contamination dispersion, etc. In reservoir simulation models, historical production and pressure data is collected to predict the flow of fluids (e.g., oil, water, gas) through porous media. Relevant model parameters include, for example, permeability, porosity and saturation. Other types of applications include biomolecular structural predictions, drug design, structural optimization, material design and nanotechnology, semiconductor design, chemo-metrics, and so forth.

The observed data (e.g., acquired or measured data) is transmitted from the data source 145 (or the client workstation 134) to the computer system 102 for processing. Other types of information may also be sent to the computer system 102 for processing. For example, the client workstation 134 may provide an input model parameter set that is determined to be a possible solution candidate of a predefined problem (e.g., inverse or optimization problem). Alternatively, the client workstation 134 may provide prior information (or prior scenarios) from which the computer system 102 may extract the input model parameter set. In addition, the client workstation 134 may provide a mathematical model (e.g., forward model) that maps the input model parameter set to the observed data.

The problem solver 120 and uncertainty assessor 122 are executed by the processor 101 to process the observed data (e.g., measured or acquired data) and any input information provided. In one implementation, the problem solver 120 generates a collection of output model parameter sets in a reduced base. The output model parameter sets are compatible with the input model parameter set and fits the observed data within a predetermined error tolerance. The uncertainty assessor 122 then processes the output model parameter sets to construct one or more uncertainty measures (e.g., probability map) that are useful for risk analysis or other types of uncertainty-related assessments. The output model parameter set and/or results of the uncertainty assessment may be transmitted to the client workstation 134 for further processing or display.

It is to be further understood that, because some of the constituent system components and method steps depicted in the accompanying figures can be implemented in software, the actual connections between the systems components (or the method steps) may differ depending upon the manner in which the present invention is programmed. Given the teachings of the present invention provided herein, one of ordinary skill in the related art will be able to contemplate these and similar implementations or configurations of the present invention.

Exemplary Method

Figure 2:
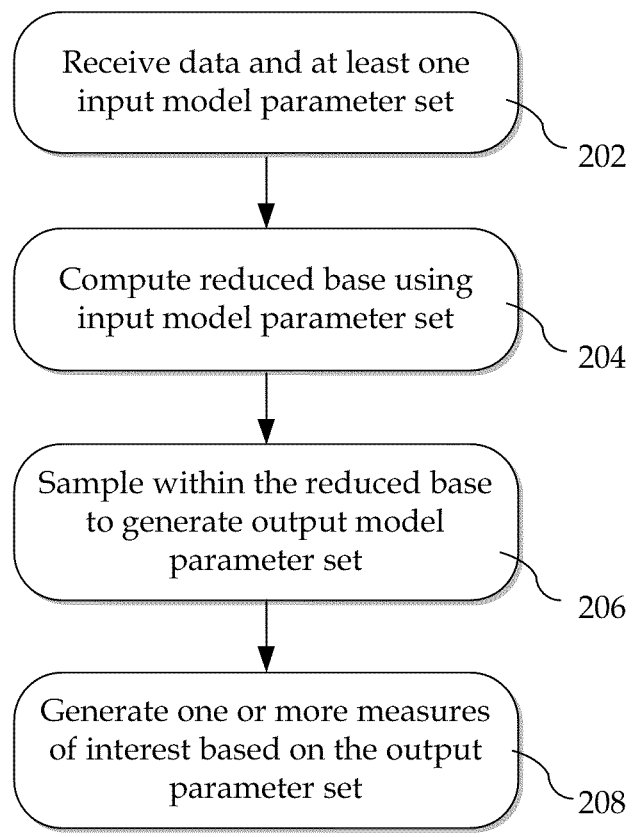
FIG. 2 shows an exemplary method.

FIG. 2 shows an exemplary method 200 of solving a predefined problem. The method 200 may be implemented by, for example, the computer system 102 described with reference to FIG. 1. The predefined problem may be an inverse problem, or a more general optimization problem, as discussed previously. An inverse problem may be treated like an optimization problem and/or sampling problem.

At 202, the problem solver 120 receives observed data (e.g., measured data) from, for example, the data source 145. As discussed previously, the data source 145 may be located externally or incorporated in the client workstation 134 or computer system 102. In addition to the observed data, at least one input model parameter set may also be received. The input model parameter set serves as a candidate solution and is related to the observed data via a model. The model is a description of a system using mathematical language. For example, the model may be a forward model which predicts the observed data from parameters in the model space (or parameter space). Mathematical models can take many forms, including but not limited to, dynamical systems, statistical models, a set of partial (or ordinary) differential equations, a set of algebraic equations, game theoretic models, etc. It is also understood that a model space, as used herein, refers to a multidimensional region describing the set of all possible values that the model parameters can take. Each point in the model space represents a model parameter set, which is a candidate or potential solution to the predefined problem. Each model parameter set includes a given number (n) of unit values or model parameters (e.g., pixels of an image).

In one implementation, the input model parameter set comprises a unique posterior model parameter set $m_0$ that is located in a valley of multiple solutions. The unique posterior model parameter set $m_0$ may be derived by using local optimization methods that converge to one of these multiple solutions. Alternatively, an ensemble of input model parameter sets ($m_1$, $m_2$, $m_3$, . . . ) may be derived from prior information (or prior scenarios). This is achieved by, for example, conditional and/or non-conditional simulation techniques, stochastic modeling or any other suitable techniques. Conditional simulation techniques include, but are not limited to, multipoint geostatistical methods, turning bands, sequential simulation, simulated annealing, probability field simulation, matrix decomposition methods, and so forth.

At 204, the problem solver 120 computes a reduced base using the input model parameter set(s). This is performed in order to reduce the dimensionality of the correlated search space and create a reduced base associated with coefficients that are consistent with the structure of the input model parameter set and observed data. These coefficients represent the coordinates of any model parameter set located in the reduced base, and are much fewer than the number of model parameters in the input model parameter set, thereby rendering the subsequent search in the reduced base more efficient.

In one implementation, the base reduction is performed by treating the exemplary misfit function $C(m)=\|F(m)-d\|_2$ as a scalar field between the model parameter spaces I (e.g., 2-D or 3-D arrays) and real numbers. For instance, in the case of a 2-D model parameter with s×n pixels, I is a space of rectangular matrices $M(s,n)$. The canonical base associated with the input model parameter set has s×n terms, but this is not very informative in guiding the search in the low misfit regions of the model space. In order to facilitate a more efficient search, lower dimensional bases (i.e. reduced bases) associated with subspaces of the model parameter space I may be constructed.

There are several ways of determining these reduced bases, depending on the dimensionality of the model parameter space I. Dimensionality of the reduced base may be established by, for example, assessing the percentage of model compression achieved. More particularly, the process of reducing the model base may be described as a process of finding a set of independent vectors $\{v_1, v_2, \ldots, v_q\}$ which are consistent with our prior knowledge. The coordinates of a model parameter set m in the reduced base may be represented as follows:

$$m - \mu \in \langle v_1, v_2, \ldots, v_q \rangle = \sum_{k=1}^{q} a_k v_k, \; q \ll n, \quad (14)$$

where $\mu$ is a fixed vector in $R^n$ or trend (which can eventually be the null-vector) and $(a_1, a_2, \ldots, a_q)$ are coefficients of the model parameter set m in the reduced base. The dimensionality of the reduced base is much lower, since the number q of coefficients a in the reduced base is much lower than the number n of the model parameters in the input model parameter set. In one implementation, the reduced base is a local base situated along the valley of the misfit landscape that represents model parameters in an optimal way. Alternatively, the reduced base may also be constructed from a set of prior scenarios (or input model parameter sets) using, for example, principal component analysis (PCA).

More specifically, the reduced base is constructed based on the input model parameter set(s). Depending on what the input model parameter set(s) includes, the reduced base may be a prior base or a posterior base. As discussed previously, the input model parameter set may include a single posterior model parameter set $m_0$ or an ensemble of model parameter sets derived from multiple prior scenarios. In the case of a single posterior model parameter set, a posterior reduced base may be built. Alternatively, in the case of the ensemble of model parameter sets, a prior reduced base may be constructed by orthogonalizing these prior scenarios using, for example, PCA or kernel PCA. The prior or posterior reduced base may be built using various techniques, such as orthogonal or non-orthogonal transformations, covariance-based or covariance-free techniques, as will be discussed in more detail later.

At 206, the problem solver 120 performs sampling in a parameter space associated with the reduced base to generate one or more output model parameter sets. Various types of sampling techniques may be employed to select model parameter sets in the reduced parameter space. For example, geometric or stochastic sampling may be performed. Alternatively, sampling is performed while optimizing in the reduced base. For example, Quasi-Newton methods and a moving local hyperquadric may be used.

In one implementation, geometric sampling is performed in the parameter space associated with the reduced base. Geometric sampling is especially useful where the computation of the forward model is very costly and includes sampling the coefficients of the reduced base in a bounded polytope. Different sparse sampling techniques, such as Latin hypercube sampling, Smolyak grids or random sampling techniques, may be performed in the reduced base. In addition, the sampling domain may be restricted by imposing different kinds of bounding and regularity constraints on the original model space. In another implementation, oriented sampling is performed. Oriented sampling may be performed by calculating the Jacobian on the reduced base, and using the information to orientate the sampling. Oriented sampling and geometric sampling may be applied at the same time. Oriented sampling can be viewed as a geometric sampling modality.

In another implementation, stochastic sampling is performed in the parameter space associated with the reduced base. Stochastic sampling is especially useful when the forward model is fast to compute. Stochastic sampling may be performed by using global optimization techniques, such as particle swarm optimizers, differential evolution, etc., and/or Monte Carlo methods. The search may first be performed in a prior reduced base until the valley of equivalent model parameter sets in the posterior is located. Once the valley is located, a reduced model posterior base may be used to improve the sampling efficiency.

At 208, the output model parameter sets are analyzed to generate one or more measures of interest that are useful for further study and assessment. In one implementation, the uncertainty assessor 122 generates uncertainty measures (e.g., indicator maps, percentile maps, E-types, etc.) of the output model parameter sets. These measures indicate, for example, the probability of occurrence of a certain feature of the model parameters in the region of low misfits. They may be used for assessing risk in various applications. For example, in geophysical applications, such measures may indicate the most likely hydrocarbon per volume, the probability of high resistance, etc. More details will be provided in the following sections.

Determining a Reduced Base

The method of reducing the base may depend on the prior knowledge (e.g., qualitative or informative) that is provided by the client (at e.g., client workstation 134). In particular, the choice of model reduction approach depends on the components that are available in the input model parameter set. As discussed previously, the reduced base may be a prior base or a posterior base. A prior reduced base is constructed based on an ensemble of input model parameter sets $(m_1, m_2, m_3, \ldots)$, whereas a posterior reduced base is constructed based on a unique model parameter set $m_0$ having low misfit. The posterior reduced base offers the advantages of higher computational efficiency and easy adaptability to the state of the art of the client's interpretation. For example, in some cases, the client may not want to change the input interpretation of the problem and would like to explore uncertainties around a prescribed model parameter set. In other cases, the client may not have a specific interpretation in mind, and the sampling has to proceed from the beginning (i.e. prior or posterior base with optimization).

In addition, the reduced base may be covariance-type or covariance-free. Covariance is a measure of the linear relation between random variables. Examples of covariance-type reduced bases include bases that are constructed by employing a PCA-based technique (e.g., PCA or kernel PCA) using a set of prior scenarios or Singular Value Decomposition (SVD) using a unique model parameter set. Covariance-free reduced bases include those constructed by using, for example, Indicator base, Discrete Cosine Transform (DCT), Discrete Wavelet Transform (DWT), Discrete Chebyshev Transform (DCHT), or Independent Component Analysis (ICA). Covariance-free bases advantageously avoid the need for matrix diagonalization, which may be infeasible in very high dimensional spaces. It is understood that any other discrete transforms based on orthogonal polynomials (e.g., Krawtchouk, Hahn, Poisson-Charlier, etc.), may also be used to find the reduced base.

Prior Reduced Bases

A prior reduced base may be constructed based on multiple prior scenarios. Constructing a prior reduced base is particularly useful where only qualitative information is available for generating a set of unconditional prior scenarios. This includes the situation where a set of gridded secondary attributes that contain partial information about the structure of the inverse problem solution (e.g., model parameters) is available, but the degree in which this set of attributes informs the solution is not known. The prior reduced base may then be constructed using these secondary attributes.

In one implementation, a prior reduced base is constructed using Principal Component Analysis (PCA). PCA is useful for determining orthogonal bases using different unconditional prior scenarios. In particular, PCA involves a mathematical procedure that transforms a number of possibly correlated variables into a number of uncorrelated variables called principal components, which are related to the original variables by an orthogonal transformation (i.e. covariance-based).

In the present context, PCA includes finding an orthogonal base of the experimental covariance matrix estimated with these prior scenarios, and then selecting a subset of the most important eigenvalues and associated eigenvectors that are used as a reduced model space base. The resulting transformation is such that the first principal component accounts for as much of the variability and each succeeding component accounts for as much of the remaining variability as possible. Kernel PCA methods may also be applied to calculate the experimental covariance and establish the model reduction.

A PCA-reduced base provides an optimal compression by gathering the commonality between prior scenarios. Linear inverse theory allows computing a PCA-reduced base from the eigenvalue decomposition of matrix $JF_{m_0}^{\,t}JF_{m_0}$, known as linearized Hessian. The PCA-reduced base may be used to optimize and find a good model parameter set in the valley. For example, the search for the good model parameter set may be performed using a global optimization method (e.g., particle swarm optimization). The geometric sampling approach may also be performed directly on the PCA-reduced base, as will be discussed later.

To understand why the PCA-reduced base improves sampling efficiency, consider the centre ($m_c$) of the local hyperquadric as follows:

$$m_c = m_0 - (JF_{m_0}^{\,t}JF_{m_0})^{\dagger} JF_{m_0}^{\,t} \Delta d, \quad (15)$$

The matrix $C^{lin} = (JF_{m_0}^{\,t}JF_{m_0})^{\dagger}$ is the pseudo-inverse (see symbol $(\bullet)^{\dagger}$) of the linearized Hessian $JF_{m_0}^{\,t}JF_{m_0}$, and it is related to the posterior covariance matrix in the model parameter set $m_0$.

Matrix $C^{lin}$ is a symmetric and definite positive matrix, and thus admits orthogonal diagonalization as follows:

$$C^{lin} = (JF_{m_0}^{\,t}JF_{m_0})^{\dagger} = VDV^t, \quad (16)$$

where the column vectors of V, $\{v_1, v_2, \ldots, v_n\}$ provide an orthonormal base of $R^n$. The V base is also involved in the singular value decomposition of the Jacobian $JF_{m_0} = U\Sigma V^T$ and in the linearized Hessian as follows:

$$JF_{m_0}^{\,t}JF_{m_0} = V\Sigma^t\Sigma V^t. \quad (17)$$

Thus, $$(JF_{m_0}^{\,t}JF_{m_0})^{\dagger} = V(\Sigma^t\Sigma)^{\dagger} V^t,$$

$$D = (\Sigma^t\Sigma)^{\dagger}. \quad (18)$$

where D denotes the diagonal form of $C^{lin}$.

Taking into account relationship (18), performing PCA on the matrix $C^{lin}$ allows for consideration of the eigenvectors $v_k$ that are associated with the highest percentage of the model posterior variability in the neighborhood of model parameter set $m_0$. The main eigenvectors $v_k$ correspond to the smallest eigenvalues on the linearized Hessian in the direction of higher variability; that is, the directions that span locally the null space of $JF_{m_0}$. In summary, performing PCA on the matrix $C^{lin}$ facilitates exploration of local uncertainties. The geometric sampling approach presented in the next section will enable this linear analysis to have a global character.

Another type of prior reduced base that may be constructed in accordance with the present framework is a target oriented base. Target oriented bases are built from prior scenarios and learning which terms are affected the most by the nonlinearities of the forward operator. This generally includes decomposing (or projecting) the different prior scenarios into the prior reduced base and learning how to modify these coefficients in order to minimize the data misfit, taking into account the misfits of the prior scenarios that have been previously calculated. The learning algorithms may be important when the forward model is very costly, since these prior scenarios have been already pre-computed to determine their misfit. Alternatively, stochastic optimization techniques may be used instead. Geometric sampling techniques may also be used for costly forward solves. Nevertheless, the sampling process may be inefficient if the base is constructed using only prior knowledge.

To construct one or more target oriented bases, a set of prior scenarios are first generated using, for example, conditional simulation techniques. The misfit values for the prior scenarios are then computed. The prior scenarios are projected onto the reduced base to determine their coefficients. Considering an ensemble of these coefficients as a training data set, learning methods are used to unravel the structure of these coefficients in order to fit the observed data. Sampling may then be performed in the region of equivalence using the target oriented bases and sampling techniques that will be described later.

There are several ways of determining the reduced base, depending on the type of prior information or knowledge that is at our disposal or the cost of individual forward solves. In one implementation, where only qualitative information is available, a set of unconditional prior scenarios may be generated by such qualitative information. For instance, in the context of a reservoir optimization problem, the prior reduced base may be built using well log information and secondary geophysical attributes. A PCA base provides a reduced base that gathers the commonality between these priors, thereby providing an optimal model reduction.

One major advantage of the present framework is that it accommodates the use of secondary attributes where data of the primary attributes of interest is not available or missing. The prior information may be, for example, a set of gridded secondary attributes which are correlated to the model parameter set of interest, and therefore provides partial information about the structure of the solution to the predetermined problem. For example, assuming that the interest lies in determining the uncertainty of meteorological data, but precipitation data in a certain region (i.e. primary attribute or model parameter set) may not be available. Nevertheless, the PCA base (or target oriented base) may still be constructed using a set of different secondary attributes, such as the altitude of the region and other suitable digitized attributes (e.g., insolation, slope, etc.).

In another implementation, a more informative secondary attribute may be available. The informative secondary attribute may be completely sampled in a grid. For instance, the porosity in a reservoir is well correlated to the seismic acoustic impedance and may be considered as an informative secondary attribute. Such secondary attribute provides information about the approximate structure of the solution of the predetermined problem (or model parameter sets of interest). The reduced base may be constructed using the secondary attribute, $\{s_k\}_{k=1,\ldots,q}$. Sampling or learning may then be performed using this reduced base.

In yet another implementation, some hard values of the model parameter sets (or primary attributes) of interest may be known at certain locations of the model space $m(x_\alpha)$, $\alpha=1$, $N_p$. For example, in meteorological applications the hard model information may be precipitation levels at certain meteorological locations, wherein the interest lies in determining the reduced base of the precipitation (or model parameter set) of a particular other region. In such case, the set of prior scenarios may be built using image-guided interpolation and/or condition simulation techniques based on the hard model information and/or secondary attribute (e.g., altitude).

More particularly, p terms of the $s_k$ base may be selected in order to fit in, for example, the least square sense, the hard model information $m(x_\alpha)$, $\alpha=1$, $N_p$. This provides the spatial trend $$t = \sum_{k=1}^{p} b_k s_k.$$

This spatial trend may be used to calculate the misfit in the hard model positions. To determine additional terms of the reduced base $\{s_k\}_{k=p+1,\ldots,q}$, a set of conditional simulations of this residual field may be generated. A PCA-based technique may be employed to expand the high frequency content of the model. Finally, telescopic sampling may be performed using t as a trend model and $\{s_k\}_{k=p+1,\ldots,q}$ as a reduced base.

Posterior Reduced Bases

Figure 3A:
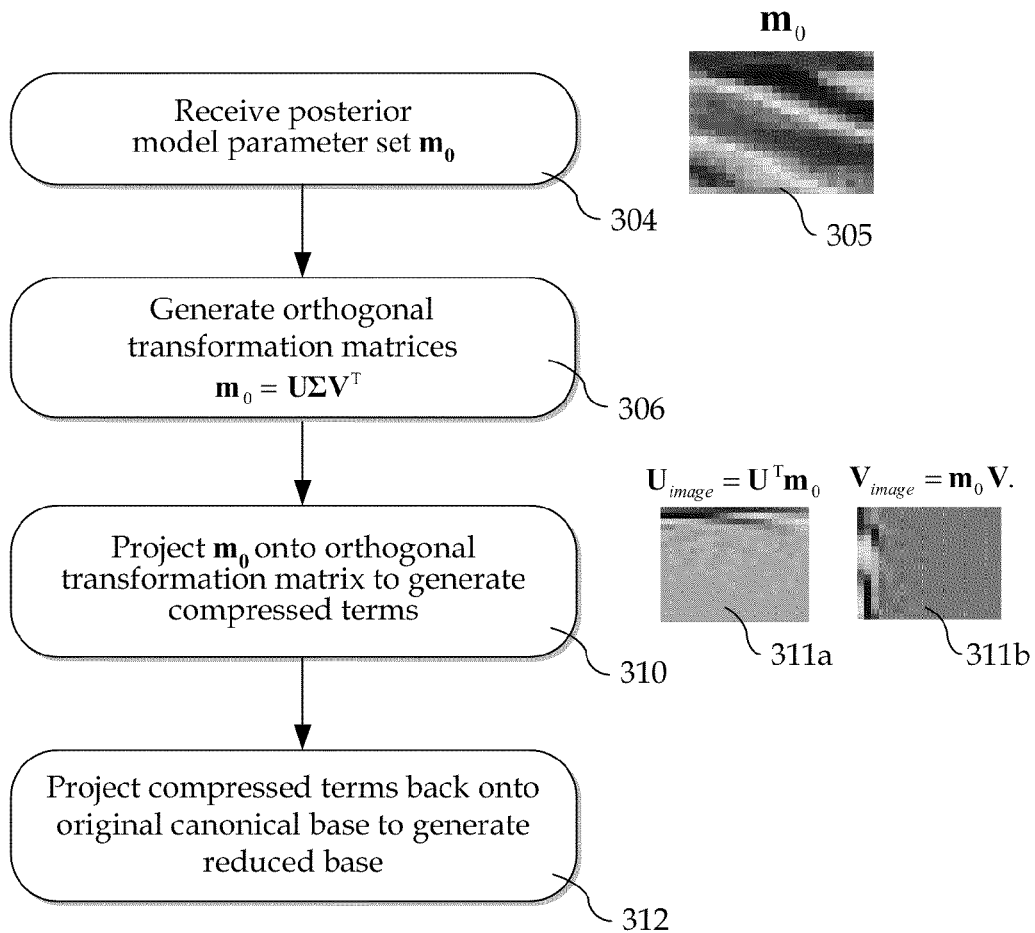
FIG. 3a shows an exemplary method of constructing an orthogonal reduced base.

A posterior reduced base, on the other hand, is constructed based on a unique posterior model parameter set $m_0$. The posterior reduced base may be orthogonal-based (e.g., SVD, DCT, DWT, DCHT, ICA, etc.) or non-orthogonal based (e.g., indicator bases, etc.). FIG. 3a shows an exemplary method 204 of constructing an orthogonal reduced base. Generally, an orthogonal reduced base is constructed by applying one or more orthogonal transformations to the posterior model parameter set $m_0$. These techniques aim to span the variability observed in the posterior model parameter set $m_0$ using a very informed base with a low number of terms.

At 304, a unique posterior model parameter set $m_0$ is received. The model parameter set $m_0$ may be generated as previously described. For example, the model parameter set $m_0$ may be a 2-D image 305 that serves as a candidate solution to an inverse problem. It is understood that although the present framework is described with reference to 2-D images, it is also applicable to parameter sets associated with one, three or other dimensionalities where separability exists or where the reduction method allows for it.

At 306, orthogonal transformation matrices are defined. In one implementation involving, for example, SVD, this involves decomposing (or factorizing) the model parameter set $m_0$ into the following form: $m_0 = U\Sigma V^T$ where U and V are orthogonal transformation matrices related by $\Sigma$, that is diagonal by blocks with non-negative real numbers. In other implementations involving, for example, DCT, DWT, DCHT, $\Sigma$ is not diagonal by blocks. Instead, its non-null coefficients are concentrated on its first rows and columns. The orthogonal transformation matrices (or bases) U and V may be determined from the matrices $m_0 m_0^T$, $m_0^T m_0$ respectively.

Various forms of orthogonal transformation matrices are possible, depending on the model reduction method used. Such model reduction methods include, for example, Singular Value Decomposition (SVD), Discrete Cosine Transform (DCT), Discrete Wavelet Transform (DWT) using different families of wavelets, Discrete Chebyshev Transform (DCHT), as will be described later. In addition, any other discrete transforms based on orthogonal polynomials (e.g., Krawtchouk, Hahn, Poisson-Charlier, etc.) may be used to construct the reduced base. Alternatively, non-orthogonal model base reduction may also be performed using indicator or level set bases. More details will be provided in the following sections.

At 310, the model parameter set $m_0$ is compressed by projecting onto one or both orthogonal matrices (U and/or V) to generate compressed terms ($U_{image}$ and/or $V_{image}$) as follows:

$$U_{image} = U^T m_0, \quad V_{image} = m_0 V. \tag{19}$$

The model parameter set $m_0$ may be compressed horizontally or vertically respectively, as illustrated by exemplary compressed images 311a and 311b. In the case of horizontal compression, the compressed term $U_{image}$ is the result of uncorrelating and compressing the first rows $r_d$ of $U_{image}$ corresponding to most of its variability. Alternatively, in the case of vertical compression, the compressed term $V_{image}$ is the result of uncorrelating and compressing the first columns $c_d$ of $V_{image}$.

The choice of using either $U_{image}$ or $V_{image}$ depends on, for example, the nature of the model parameter set $m_0$. $U_{image}$ may provide a more effective compression than $V_{image}$ where the model parameter set $m_0$ is horizontally stratified. Conversely, $V_{image}$ may provide a more effective compression than $U_{image}$ where the model parameter set $m_0$ is vertically stratified.

In the case of horizontal compression, a thresholding matrix $T_i$ may be defined as a zero matrix with the dimensions of $U_{image}$ but containing only its i-th row:

$$T_i(k,:) = U_{image}(k,:)\delta_{ik}, \quad k=1,\ldots,s; \quad i=1,\ldots,r_d, \tag{20}$$

where $\delta_{ik}$ denotes the Kronecker delta function and k denotes the row index. Similarly, in the case of vertical compression, the thresholding matrix $T_i$ may be defined as a zero matrix with the dimensions of $V_{image}$ but containing only its i-th column:

$$T_i(:,k) = V_{image}(:,k)\delta_{ik}, \quad k=1,\ldots,q; \quad i=1,\ldots,c_d, \tag{21}$$

where $\delta_{ik}$ denotes the Kronecker delta function and k denotes the column index.

At 312, the reduced base may be derived using the thresholding matrix $T_i$ by projecting the compressed terms back onto the original canonical base associated with the posterior model parameter set $m_0$. In the case of horizontal compression, where the orthogonal matrix U may also be used, the dimensionality of the model space may be reduced by projecting the first $r_d$ threshold matrices back onto the original canonical base $bu_i$ as follows:

$$bu_i = UT_i, \quad i=1,\ldots,r_d. \tag{22}$$

where $r_d$ represents the dimension of the subspace in which the model parameter set $m_0$ is projected. This exemplary model reduction using the orthogonal matrix U is particularly useful when V is hard to compute (e.g., landscape images in underdetermined systems). Alternatively, in the case of vertical compression, $V_{image}$ may be used as follows:

$$bv_i = T_i V^T, i=1, \ldots, c_d. \tag{23}$$

This exemplary model reduction using the orthogonal matrix V is particularly useful when U is hard to compute (e.g., portrait images in overdetermined systems).

If both orthogonal matrices U and V are fast to compute, it may also be possible to use the compressed diagonal matrix Σ and transform back as follows:

$$T_i(:,k) = \Sigma(:,k)\delta_{ik}, k=1, \ldots, q; i=1, \ldots, c_d. \tag{24}$$

$$b_i = U T_i V^T, i=1, \ldots, c_d. \tag{25}$$

$c_d$ has the same role as $r_d$ in the case of $U_{image}$. The same transformation may also be performed row-wise as follows:

$$T_i(k,:) = \Sigma(k,:)\delta_{ik}, k=1, \ldots, q; i=1, \ldots, c_d. \tag{26}$$

$$b_i = U T_i V^T, i=1, \ldots, c_d. \tag{27}$$

In the case of SVD, both compressions generate the same results because Σ has a diagonal form by blocks.

The reduced base generated in accordance with the present framework offers many useful properties that can be exploited. One such advantageous property, for example, is that exact model compression may be performed. Exact model compression involves transforming back all the higher frequencies vectors of the $U_{image}$ (or $V_{image}$) into a single base vector that gathers all the high frequency terms of the orthogonal decomposition. For instance, in the case of horizontal compression using $U_{image}$, the transformation is as follows:

$$T_{q+1}(q+1:end,:) = U_{image}(q+1:end,:), \tag{28}$$

$$bu_{q+1} = UT_{q+1}, \tag{29}$$

where q denotes the number of terms that are transformed individually.

Another advantageous property of the reduced base is that group compression may also be performed. Group compression includes compressing groups of rows or columns of the uncorrelated image represented by the threshold matrices. In the case of vertical compression using $V_{image}$, the transformation for group compression may be as follows:

$$T_{i_1:i_2}(:,i_1:i_2) = V_{image}(:,i_1:i_2), \tag{30}$$

$$bv_{i_1:i_2} = T_{i_1:i_2} V^T. \tag{31}$$

Group compression is particularly useful when discrete wavelet transform (DWT) is applied, because the base terms have a compact support that varies with the wavelet family that has been used. It is also useful when Chebyshev transform is applied, because Chebyshev polynomials of degree higher than fifty are unstable. In such case, the base is calculated by transforming the image by blocks.

Figure 3B:
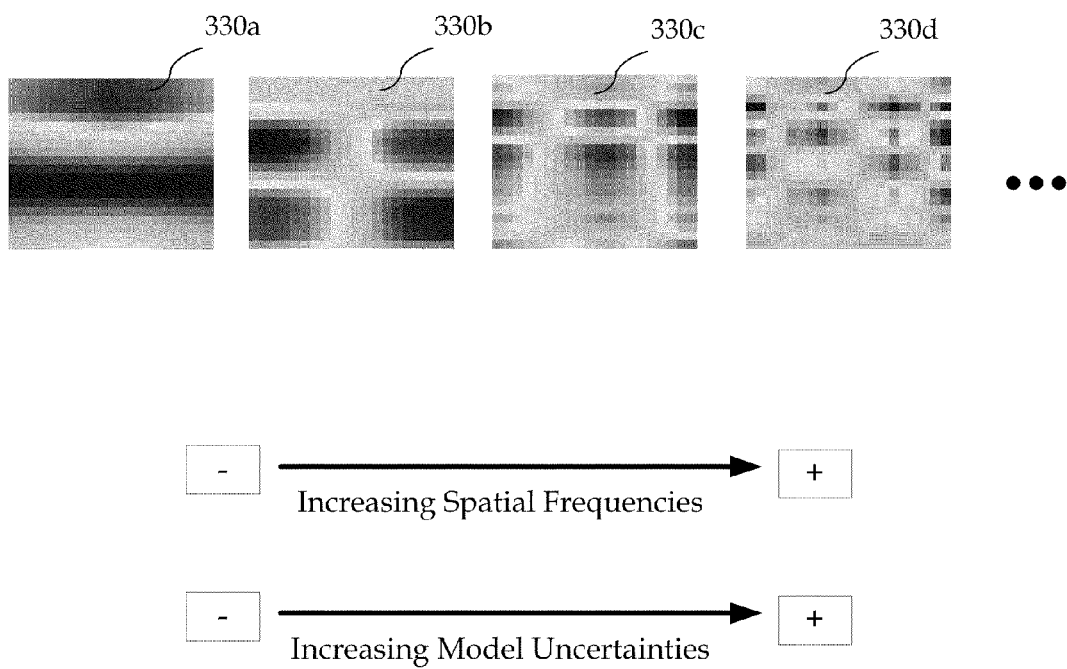
FIG. 3b shows images representing exemplary reduced base terms with increasing spatial frequencies.

It is worth noting that reduced bases built using orthogonal transformations have a ranked character; that is, vectors with higher indexes expand less part of the total energy of the image (or model parameter set). FIG. 3b shows images 330a-d representing exemplary reduced base terms with increasing spatial frequencies. As the spatial frequency of the higher terms of the reduced base increases, the reduced base terms 330a-d expand details of the image corresponding to more uncertain parts of the model space. Although a certain number of base terms may be used to project the image (or model parameter set), all of them may be at disposal and may be used to analyze the uncertainties related to the presence of these high frequency terms. This advantageous property is useful in the telescopic geometric sampling approach, as will be described in more detail later.

Singular Value Decomposition (SVD)

In one implementation, Singular Value Decomposition (SVD) is employed to define the orthogonal transformation matrices in step 306 of FIG. 3a. Generally, SVD represents the factorization of any rectangular matrix G∈M(s,n) in the following form:

$$G = U\Sigma V^T. \tag{32}$$

where U and V are orthogonal matrices that provide orthonormal bases for sets of real numbers ($R^s$ and $R^n$) in s- and n-dimensional spaces respectively. Σ is a s-by-n box-diagonal matrix with non-negative real numbers on the diagonal, called the SVD of the matrix (i.e. image) G. The base U comes from the eigenvalue decomposition (e.g., PCA) of the row correlation matrix $GG^T$, and the base V may be calculated from the eigenvalue decomposition (e.g., PCA) of the column correlation matrix $G^T G$.

The row and column correlation matrices $GG^T$ and $G^T G$ may be calculated as follows:

$$GG^T = U\Sigma\Sigma^T U^T,$$

$$G^T G = V\Sigma^T\Sigma V^T. \tag{33}$$

Both correlation matrices have the same rank as the original image G. SVD is usually applied in inverse theory to the matrix G of a linear system of the kind: G m=d, since this system transforms into the following form:

$$\Sigma V^T m = U^T d. \tag{34}$$

By substituting the model parameter set $m_V = V^T m$ and data $d_U = U^T d$ expressed on the V and U bases, the system becomes diagonal by blocks as shown in the following equation:

$$\Sigma m_V = d_U. \tag{35}$$

Figure 4:
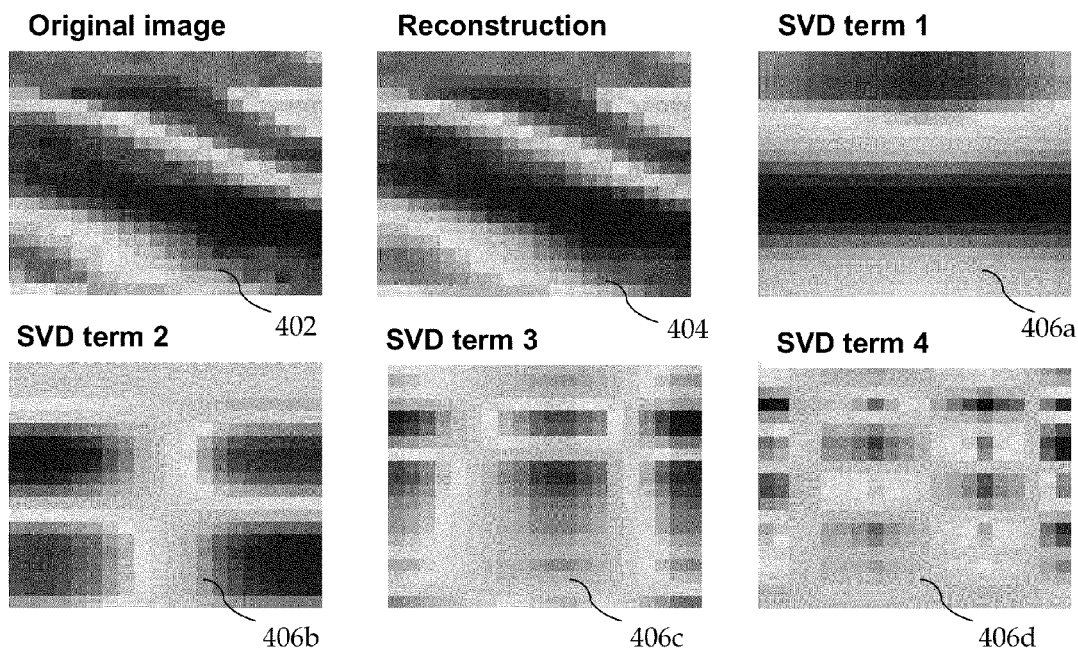
FIG. 4 shows an exemplary application of singular value decomposition on a model.

A similar idea may be applied to the inverse model candidate solution $m_0$. In one implementation, the model parameter set $m_0$ is a 2-D image, such as the conductivity or the P-velocity field in a 2-D electromagnetic or seismic tomography problem. FIG. 4 illustrates an exemplary application of SVD to a 2-D representation of a geological layer (or model) to achieve model reduction. The original image 402 representing $m_0$ may be reconstructed into image 404. The reconstruction is based on the first 5 principal modes of the image 402 determined using SVD. Images 406a-d show the first 4 terms of the reduced base. In this case, $m_0$ is the matrix that is used to perform the SVD:

$$m_0 = U\Sigma V^T.$$

Once the bases U, V are calculated, the image $m_0$ may be projected onto any or both bases, as described previously with respect to step 310 shown in FIG. 3a:

$$U_{image} = U^T m_0, V_{image} = m_0 V. \tag{36}$$

Finally, as discussed previously, in the case of horizontal compression, a matrix, $T_i$, may be defined as a zero matrix with the dimensions of $U_{image}$ but containing only its i-th row:

$$T_i(k,:) = U_{image}(k,:)\delta_{ik}, k=1, \ldots, s; i=1, \ldots, r_d. \tag{37}$$

As discussed previously with respect to step 312 of FIG. 3a, the reduced base may be derived by projecting the first $r_d$ threshold matrices back onto the original canonical base as follows:

$$bu_i = UT_i, i=1, \ldots, r_d. \tag{38}$$

It is understood that a similar procedure using $V_{image}$ may be performed in the case of vertical compression, as follows:

$$T_i(:,k) = V_{image}(:,k)\delta_{ik}, \ k=1, \ldots, q; \ i=1, \ldots, c_d, \quad (39)$$

$$bv_i = T_i V^T, \ i=1, \ldots, c_d. \quad (40)$$

To generate the reduced base, full SVD may also be applied to the compressed diagonal matrix $\Sigma$, as shown:

$$T_i(:,i) = \Sigma(:,i), \ i=1, \ldots, q, \quad (41)$$

$$b_i = U T_i V^T, \ i=1, \ldots, c_d. \quad (42)$$

SVD achieves optimum compression, but it may not be feasible to apply on a whole image with large number of pixels. Some free-diagonalization methods may be required to achieve the compression and find the reduced base. SVD may be applied to both 2-D and 3-D images. In one implementation, higher order SVD may be used to expand this methodology to 3-D. Alternatively, the 3-D image may be transformed into a new 2-D image by reshaping its different layers. The reduced base may be determined based on this new 2-D image and transformed back to the original 3-D space.

For landscape images with a higher number of columns, the U base may be generated by diagonalizing $m_0 m_0^T$ following the smallest dimension. The reduced base may then be determined by using $U_{image} = U^T m_0$. Similarly, for portrait images with higher number of rows, it is possible to diagonalize $m_0^T m_0$ following the smallest dimension to determine the V base, and finally to determine the reduced base using $V_{image} = m_0 V$.

Discrete Cosine Transform (DCT)

In another implementation, discrete cosine transform (DCT) is employed to define the orthogonal transformation matrices in step 306 of FIG. 3a. DCT is a Fourier-related transform similar to the discrete Fourier transform (DFT) operating in real data. Like any Fourier-related transform, DCT expresses a function or a signal in terms of a sum of sinusoids with different frequencies and amplitudes.

One possible DCT definition of a 1-D sequence $\{y_0, y_1, \ldots, y_{N-1}\}$ of length N is:

$$dct(u) = c(u) \sum_{k=0}^{N-1} y_k \cos\left(\frac{\pi(2k+1)u}{2N}\right), \ u=0, 1, \ldots, N-1, \quad (43)$$

$$c(u) = \begin{cases} \frac{1}{\sqrt{N}} & \text{for } u = 0, \\ \frac{\sqrt{2}}{\sqrt{N}} & \text{for } u \neq 0. \end{cases}$$

Figure 5:
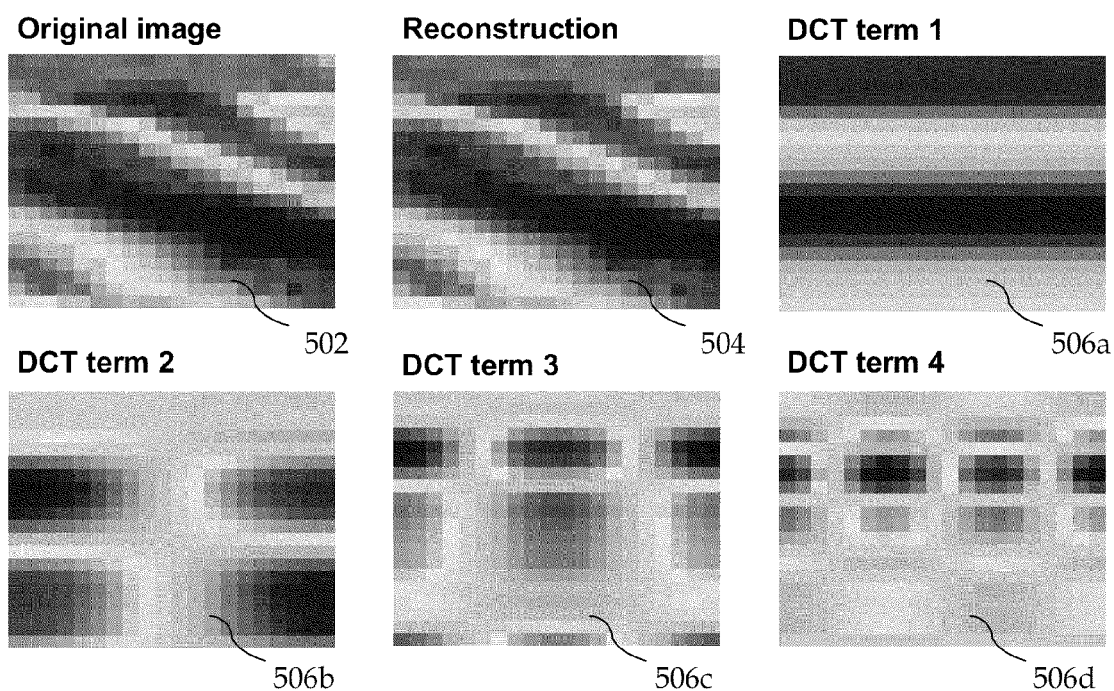
FIG. 5 shows an exemplary application of discrete cosine transform on a model.

DCT is a separable transformation that may also be defined in higher dimensions. For example, for an image $m_0 \in M(s,n)$, the DCT may be defined as follows:

$$dct(u,v) = c(u)c(v) \sum_{i=0}^{s-1} \sum_{j=0}^{n-1} m_0(i,j) \cos\left(\frac{\pi(2i+1)u}{2s}\right) \cos\left(\frac{\pi(2j+1)v}{2n}\right), \quad (44)$$

$$u = 0, 1, \ldots, s-1, \ v = 0, 1, \ldots, n-1,$$

$$c(\alpha) = \begin{cases} \frac{1}{\sqrt{N}} & \text{for } \alpha = 0, \\ \frac{\sqrt{2}}{\sqrt{N}} & \text{for } \alpha \neq 0. \end{cases}$$

where N denotes the number of rows or columns of the image. A similar transformation may be defined for 3-D images or images of any other dimensionality. FIG. 5 shows the exemplary application of DCT on an image 502. Image 504 may be reconstructed by using the first 5 principal modes of the image determined by using DCT. Images 506 a-d show the 4 first terms of the reduced base.

In one implementation, DCT is written in matrix form as follows:

$$D = L m_0 R^T, \quad (45)$$

where D is the two-dimensional cosine transform of the $m_0$ image, and L and R are two orthogonal matrices, which may be defined as follows:

$$L_{ij} = R_{ij} = \begin{cases} \frac{1}{\sqrt{\lambda}} & \text{if } i = 0 \\ \sqrt{\frac{2}{\lambda}} \cos\frac{(2j+1)i\pi}{2\lambda} & \text{if } i > 0 \end{cases} \quad \lambda = s \text{ or } n. \quad (46)$$

Discrete Wavelet Transform (DWT)

Figure 6:
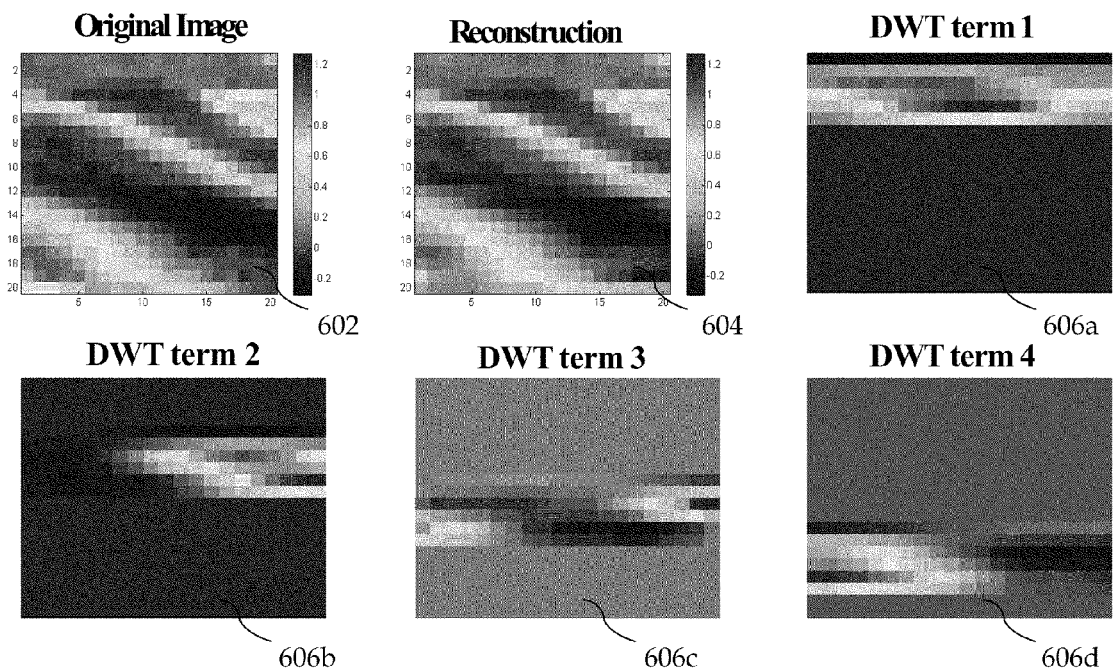
FIG. 6 shows an exemplary application of discrete wavelet transform on a model.

In yet another implementation, discrete wavelet transform (DWT) is employed to define the orthogonal transformation matrices in step 306 of FIG. 3a. FIG. 6 shows an exemplary application of DWT on an original image 602, which represents a geological layer. The exemplary image 604 may be reconstructed by using the first 4 principal modes (606a-d) of the image 602, which are determined by DWT using the Daubechies family. It should be understood that other wavelet families (e.g., Symlets, Coiflets, etc) may also be used.

In one implementation, the original image (or model parameter set) is represented in the form $m_0 \in M(s,n)$. The image $m_0$ may be decomposed into orthogonal wavelet transformation matrices $U_w$ and $V_w$ as follows:

$$m_0 = U_w m_{LR} V_w^T. \quad (47)$$

The image, $m_0$, may be projected onto one or the other ($U_w$ and $V_w$) for horizontal or vertical compression respectively, as follows:

$$U_{image} = U_w^T m_0, \text{ and } V_{image} = m_0 V_w. \quad (48)$$

In fact, $U_w = W_L^T$ and $V_w = W_R^T$, where $W_L$ and $W_R$ are orthogonal matrices, as follows:

$$W_L = \left[\frac{H}{G}\right]_s, \ W_R = \left[\frac{H}{G}\right]_n. \quad (49)$$

where H represents a low pass or averaging portion and G represents the high pass or differencing portion of the matrices $W_L$ and $W_R$. The following relationship may apply:

$$m_{LR} = W_L m_0 W_R^T \quad (50)$$
$$= \left[\frac{H}{G}\right]_s m_0 [H^T | G^T]_n$$
$$= \left[\frac{H m_0 H^T | H m_0 G^T}{G m_0 H^T | G m_0 G^T}\right]_{(s,n)},$$

$$m_{LR} = W_L m_0 W_R^T = \left[\frac{B | V}{H | D}\right]_{(s,n)}. \quad (51)$$

where B is the blur, V is the vertical difference, H is the horizontal difference and D is the diagonal difference.

In the case of horizontal compression, $U_{image}$ may be expressed as follows:

$$U_{image} = W_L m_0 = \left[\frac{H}{G}\right]_m m_0 = \left[\frac{H m_0}{G m_0}\right]_{(s,n)}. \quad (52)$$

This means that $U_{image}$ has the blur in its upper part and the details in its lower part. For vertical compression, $V_{image}$ may be expressed as follows:

$$V_{image} = m_0 W_R^T = [(H m_0^T)^T | (G m_0^T)^T]_{(s,n)} [m_0 H^T | m_0 G^T]_{(s,n)} \quad (53)$$

where the partial blur is located on the left part and the details on its right.

It is understood that different kind of filters (or wavelet families) may be used for this purpose. These families of wavelets define a discrete wavelet transform having a maximum number of vanishing moments. Haar, Daubechies, Symlets and Coiflets wavelets are examples of these families. Wavelets have compact support to allow localization of singularities in the space (time)-frequency domain. Due to the compact support of the wavelets, the wavelet reduced bases may also have a compact support. To determine the reduced base, certain groups of spatial frequencies may be transformed together back to the original space.

Discrete Chebyshev Transform (DCHT)

Figure 7:
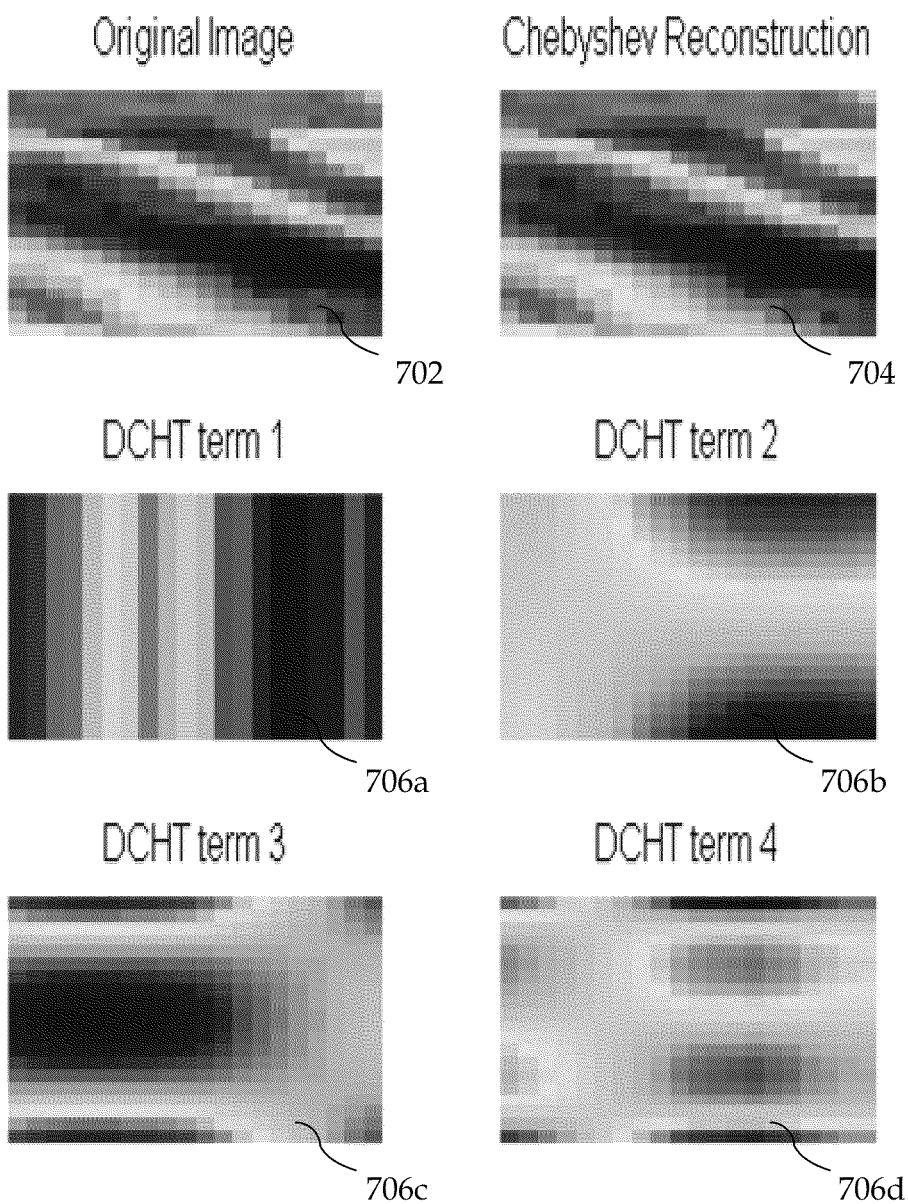
FIG. 7 shows an exemplary application of discrete Chebyshev transform on a model.

In yet another implementation, the orthogonal transformation matrices in step 306 of FIG. 3a are determined using discrete Chebyshev transform (DCHT). FIG. 7 shows an exemplary application of DCHT to the image 702, which serves as a 2-D input model parameter set $m_0$. The exemplary image 704 may be reconstructed by applying DCHT to determine the first 5 principal modes of the image 702. Image 706a-d show the first 4 terms of the DCHT reduced base.

DCHT is a separable transformation that may also be defined in one dimension (1-D), two-dimensions (2-D) or higher dimensionalities. For example, for an image $m_0 \in M(s, n)$, the DCHT may be defined as follows:

$$dcht(u,v) = \sum_{i=0}^{s-1} \sum_{j=0}^{n-1} m_0(i,j) t_u(i) \cdot t_v(j), \quad (54)$$

$$u = 0, 1, \ldots, s-1, v = 0, 1, \ldots, n-1,$$

where $t_u(i)$, $t_v(j)$ are 1-D discrete scaled Chebyshev polynomials as defined below.

For a given positive integer N (usually the matrix size) and a value x in the range [0, N−1], the scaled Chebyshev polynomials $t_n(x)$, n=0, 1, . . . , N−1 may be defined using the following recurrence relationship:

$$t_0(x) = \frac{1}{\sqrt{N}}, \quad (55)$$

$$t_1(x) = (2x + 1 - N)\sqrt{\frac{3}{N(N^2-1)}},$$

$$t_n(x) = (\alpha_1 x + \alpha_2)t_{n-1}(x) + \alpha_3 t_{n-2}(x), n = 2, 3, \ldots N-1,$$

$$x = 0, 1, \ldots, N-1.$$

where $$\alpha_1 = \frac{2}{n}\sqrt{\frac{4n^2-1}{N^2-n^2}}, \quad (56)$$

$$\alpha_2 = \frac{1-N}{n}\sqrt{\frac{4n^2-1}{N^2-n^2}},$$

$$\alpha_3 = \frac{1-n}{n}\sqrt{\frac{2n+1}{2n-3}}\sqrt{\frac{N^2-(n-1)^2}{N^2-n^2}}.$$

When the degree becomes large, the Chebyshev polynomials tend to exhibit numerical instabilities if the recurrence relations are not properly used. For that reason, the following relationships may be used instead:

$$t_n(0) = -\sqrt{\frac{N-n}{N+n}}\sqrt{\frac{2n+1}{2n-1}} t_{n-1}(0), n = 1, \ldots, N-1, \quad (57)$$

$$t_n(1) = \left(1 + \frac{n(1+n)}{1-N}\right) t_n(0),$$

$$t_n(x) = \gamma_1 t_n(x-1) + \gamma_2 t_n(x-2), n = 1, 2, \ldots N-1,$$

$$x = 2, 3, \ldots, N-1.,$$

with $$\gamma_1 = \frac{-n(n+1) - (2x-1)(x-N-1) - x}{x(N-x)}, \quad (58)$$

$$\gamma_2 = \frac{(x-1)(x-N-1)}{x(N-x)}.$$

The model reduction may be performed by constructing two orthogonal matrices, $U_s$ and $V_n$, such that:

$$D = U_s m_0 V_n \quad (59)$$

where the ith-row of the matrices $U_s$ and $V_n$ are the Chebyshev moments of the i-degree Chebyshev polynomial. As mentioned previously, the Chebyshev polynomials of degree higher than fifty are very unstable. In such case, the reduced base may be calculated by transforming the image by blocks.

Independent Component Analysis (ICA)

Figure 8:
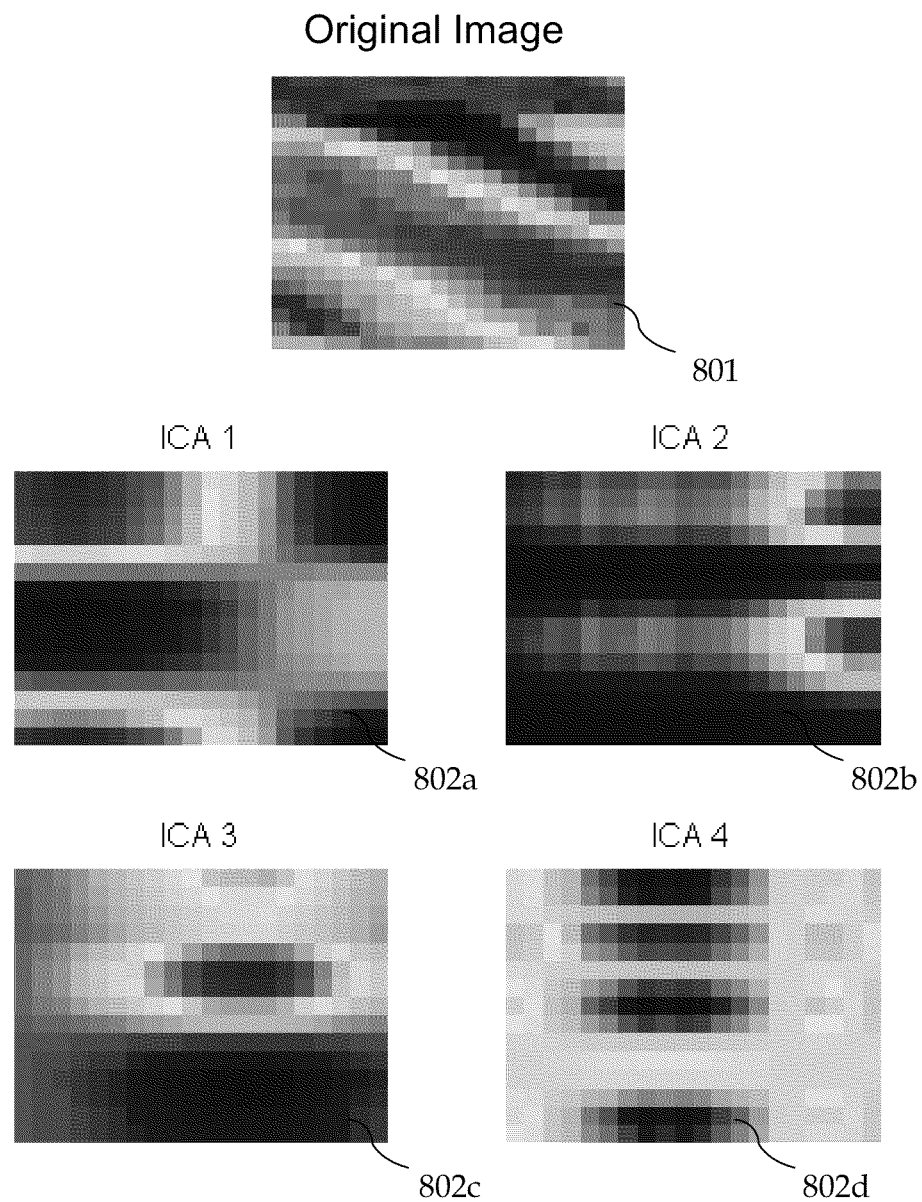
FIG. 8 shows an exemplary application of independent component analysis on a model.

In another implementation, independent component analysis (ICA) is employed to define the orthogonal transformation matrices in step 306 of FIG. 3a. FIG. 8 shows the exemplary application of ICA on the original image 801. Reconstruction may be performed by applying ICA on the first 4 independent principal base terms (802a-d).

Independent component analysis (ICA) involves finding a linear representation of non-Gaussian image so that the components are statistically independent, or as independent as possible:

$$\text{Image} = A \cdot Ic, \quad (60)$$

where both the linear transform A and the independent components Ic are determined by maximizing the non-Gaussian character of the independent components. Once this problem is solved, the reduced base is determined by processing Ic in the same way as described above with respect to the orthogonal transformations.

Spatial Indicator Base

Figure 9:
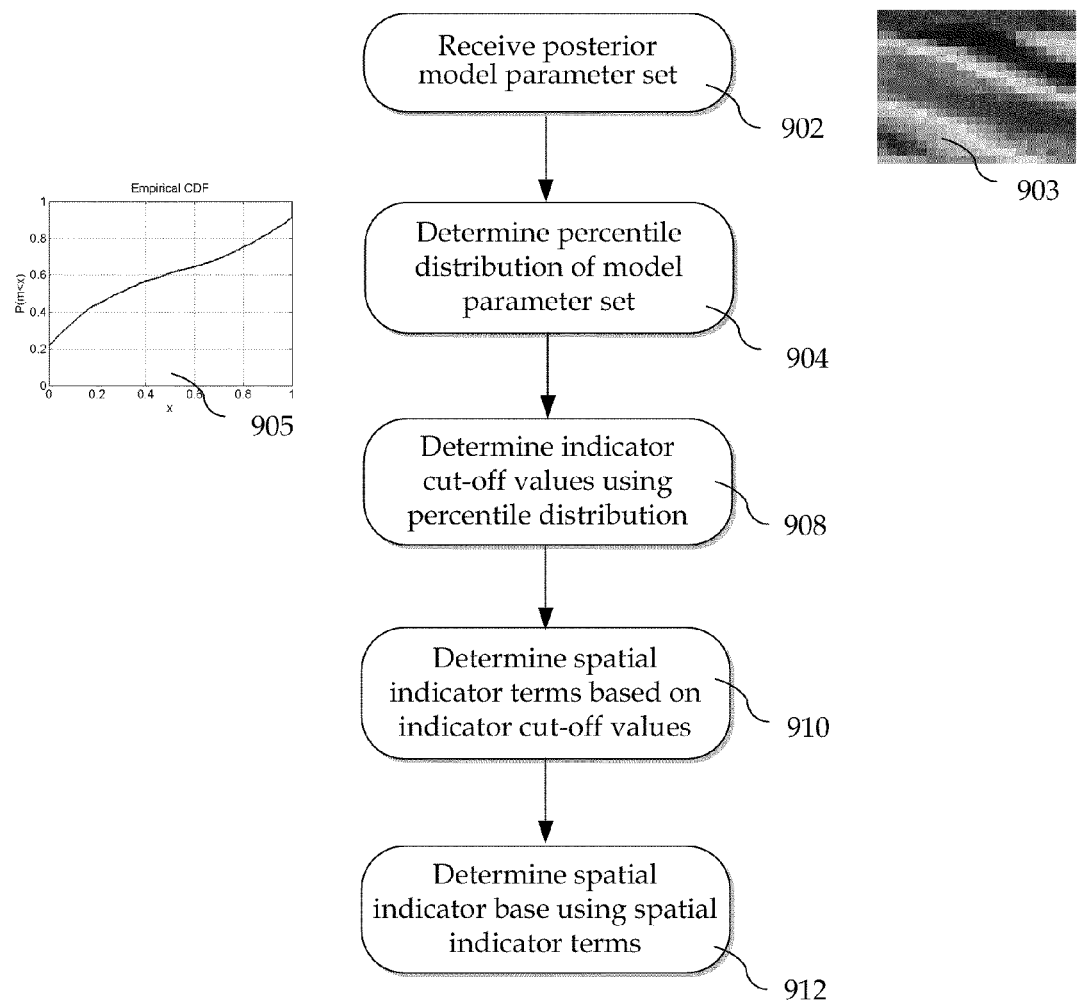
FIG. 9 shows another exemplary method for computing a spatial indicator reduced base.

FIG. 9 illustrates an exemplary alternative method 204 for computing an orthogonal reduced base by using spatial indicators. In this case, the computation of this base is not based on orthogonal transformations, as previously described with respect to FIG. 3a. Instead, the method 204 includes generating the indicator base (or level set) of an image Image∈M(s,n).

Referring back to FIG. 9, at 902, a posterior model parameter set is received. In one implementation, the posterior model parameter set is generated using the previously described methods. The model parameter set may be a 2-D image ("Image"), such as geological layer image 903. Other dimensionalities (e.g., 3-D) are also useful.

At 904, the percentile distribution of the model parameter set (or Image) is computed. The percentile distribution describes the statistical distribution of a random variable (e.g., pixel values) associated with the image. The model percentile distribution may be represented by, for example, an empirical cumulative distribution function (CDF), such as graph 905 shown in FIG. 9.

At 908, indicator cut-off values are determined based on the percentile distribution. This may involve computing the mean $\mu$ of the Image and subtracting it from the Image, leaving a residual image R=Image−$\mu$∈M(s,n). The mean $\mu$ may be computed globally, column-wise and/or row-wise, depending on the desired amount of variability in the image that needs to be maintained. In such case, the percentile distribution may be based on the residual image. For each pixel of the residual image R, an indicator cut-off variable is defined for a certain cut-off threshold t:

$$I(i, j, t) = \begin{cases} 1 & \text{if } R(i, j) \leq t, \\ 0 & \text{if } R(i, j) > t. \end{cases} \quad (61)$$

At 910, one or more spatial indicator terms are determined. All the pixels of the image that have the same indicator variable for a certain cut-off are related. These cut-offs correspond to percentile values of the residual image R. Once several percentiles of the image have been selected (e.g., lower, median and upper quartile of this probability distribution), each of the pixels that verifies $I_k(i, j, t_k)=1$ is given a unit value. This procedure will provide a set of indicator spatial terms $\{I_1, I_2, \ldots, I_q\}$ for each pixel that contains redundant information.

At 912, the spatial indicator base is determined using the spatial indicator terms $\{I_1, I_2, \ldots, I_q\}$. In one implementation, two consecutive terms of this set (thus removing the redundancy) are subtracted to produce the reduced orthogonal base $\{Ib_1, Ib_2, \ldots, Ib_q\}$. The residual image R obtained after subtracting the mean is projected onto this base by, for example, the least-squares method:

$$a=(M^tM)^{-1}M^tR. \quad (62)$$

where M is the matrix $[Ib_1, Ib_2, \ldots, Ib_q]$ built with the vectors of the indicator base.

Given the coefficients of the residual a on the indicator base, the last term or residual Ires may be computed so as to make the reconstruction exact:

$$Ires = \text{Imager} - \mu - \sum_{i=1}^{q} a_i Ib_i, \quad (63)$$

where q is the number of percentiles that have been selected and gives the dimension of the reduced space into which the model parameter set is projected. If the residual Ires is taken into account, the dimension of the reduced space will be q+1.

Figure 10:
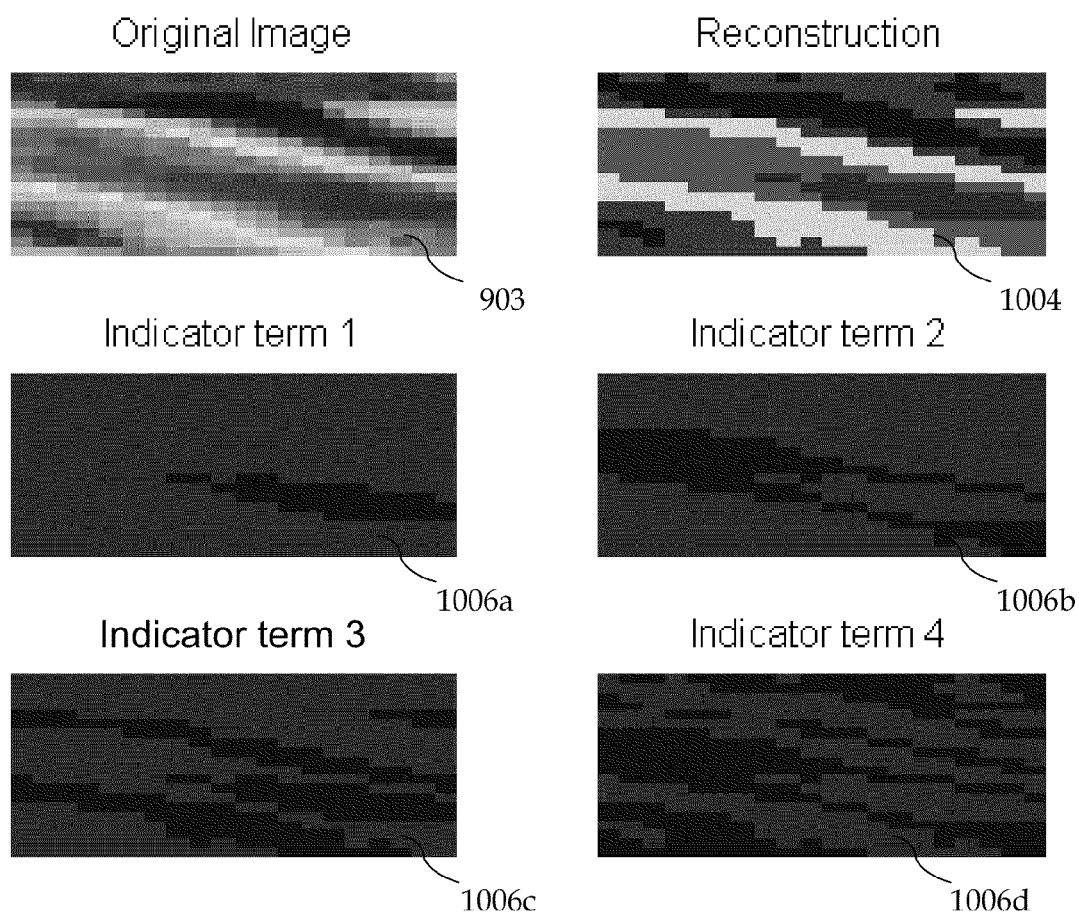
FIG. 10 shows an exemplary application of spatial indicator-based method on a model.

FIG. 10 illustrates the exemplary application of the spatial indicator-based method 204 on the original image 903. Image 1004 may be reconstructed by applying the spatial indicator-based method 204 on the first 5 principal modes of the original image 903. Images 1006a-d show the first 4 terms of the spatial indicator reduced base.

Jacobian and Hessian in the Reduced Base

One of the key advantages of the reduced base is that it facilitates the computation of the Jacobian and Hessian matrices, which were previously almost impossible or infeasible to compute in high dimensional spaces. The Jacobian matrix represents the first-order derivatives of the cost function in the reduced base, while the Hessian matrix is a square metric of the second-order partial derivatives. Both matrices are useful in the sampling and/or optimization steps, which will be described later. The Jacobian, for example, may be used to provide the local direction of the valley and orientate the sampling. The Hessian provides curvature information of the valley, and the kind of hyperquadric that may be locally fitted to the cost function. The Hessian also provides information about the presence of saddle points that serve to connect different basins of potential solutions.

To compute the Jacobian and Hessian matrices in the reduced base, the model parameter set $m_0$ may first be expressed as $$m_0 = \sum_{k=1}^{q} v_k = (1, \ldots, 1)_{\{v_1, v_2, \ldots, v_q\}},$$

where $v_k$ are the vectors of the reduced base. Expanding any other model on the reduced base, $$m = \sum_{k=1}^{q} a_k v_k,$$

the hyperquadric of equivalence in the reduced space becomes:

$$b^t JF'_{(1,\ldots,1)} JF_{(1,\ldots,1)} b + 2\Delta d^t JF_{(1,\ldots,1)} b + \|\Delta d\|_2^2 = tol^2, \quad (64)$$

$$b = (a_1 - 1, \ldots, a_q - 1)_{\{v_1, \ldots, v_q\}} = a - a_0,$$

where $$JF_{(1,\ldots,1)_{\{v_1,\ldots,v_q\}}} = \left(\frac{\partial F}{\partial a_1}, \frac{\partial F}{\partial a_2}, \ldots, \frac{\partial F}{\partial a_q}\right)_{(1,\ldots,1)_{\{v_1,\ldots,v_q\}}} \quad (65)$$

$$= \begin{pmatrix} \frac{\partial d_1}{\partial a_1} & \frac{\partial d_1}{\partial a_2} & \cdots & \frac{\partial d_1}{\partial a_q} \\ \frac{\partial d_2}{\partial a_1} & \frac{\partial d_2}{\partial a_2} & \cdots & \frac{\partial d_2}{\partial a_q} \\ \cdots & \cdots & \cdots & \cdots \\ \frac{\partial d_s}{\partial a_1} & \frac{\partial d_s}{\partial a_2} & \cdots & \frac{\partial d_s}{\partial a_q} \end{pmatrix}_{(1,\ldots,1)_{\{v_1,\ldots,v_q\}}}.$$

To compute the Jacobian in the reduced base, the q coefficients may be perturbed around the point $(1, \ldots, 1)_{\{v_1, \ldots, v_q\}}$ as follows:

$$F((1, \ldots, 1_j + \varepsilon, \ldots, 1_q)_{B_V}) - \quad (66)$$

$$\frac{\partial F}{\partial a_j} \approx \frac{F((1, \ldots, 1_j, \ldots, 1_q)_{B_V})}{\varepsilon} = \frac{F(m_{j\varepsilon}) - F(m_0)}{\varepsilon}.$$

As mentioned previously, the Jacobian matrix $JF_{(1,\ldots,1)} = U_{(s,s)}{}' \Sigma_{(s,q)} (V_{(q,q)}{}')^t$ may be generated by computing q additional forward solves for all the data points. The Jacobian matrix may have a size (s,q), and if s>q and its rank is s, its singular value decomposition may have non-null singular values that will give us the extent of the equivalences on the reduced space. The q singular vectors contained in $V_{(q,q)}{}'$ provide the local orientation of the valley in the reduced space.

The hyperquadric of equivalence on the original model space is:

$$(m-m_0)^t JF_{m_0}{}^t JF_{m_0}(m-m_0) + 2\Delta d^t JF_{m_0}(m-m_0) + \|\Delta d\|_2^2 = \text{tol}^2. \quad (67)$$

The Jacobian in the m-space and in the a-space are related as follows:

$$JF_{m_0} = JF_{a_0} V^T, \quad (68)$$

where $V = [v_1, \ldots, v_q]$ is the orthogonal matrix containing the vectors of the reduced base. The hyperquadric in the reduced space then becomes:

$$(a-a_0)^t JF_{a_0}{}^t JF_{a_0}(a-a_0) + 2\Delta d^t JF_{a_0}(a-a_0) + \|\Delta d\|_2^2 = \text{tol}^2, \quad (69)$$

where $a_0 = (1, \ldots, 1)_{\{v_1, v_2, \ldots, v_q\}}$ and $JF_{a_0}$ is a (s,q)-matrix easy to "diagonalize" via SVD.

Equation (64) means that the problem becomes less ill-posed in the reduced space. This is because s will become greater than q eventually, and all the singular values of the Jacobian will be non-zero, thereby creating an over-determined system. This provides a criterion to determine, in practice, the maximum number of terms in the base that are going to be informed by the data (s).

Relationship (68) may also be used to express the Jacobian in the reduced base once it is known in the pixel base. This may be important because the Jacobian in the pixel base may also be calculated using adjoint methods. Furthermore, the Hessians of the component functions $f_k$ in both bases are orthogonally similar, as shown by the following relationship:

$$Hf_k(m_0) = V^t Hf_k(a_0) V. \quad (70)$$

Sampling in the Reduced Base

Once the reduced base is built, sampling may be performed in the reduced-dimensional model parameter space associated with the reduced base using various sampling methods. These sampling methods include geometric sampling, stochastic sampling, oriented sampling, and sampling while optimizing using the local hyperquadric, as will be described in the following sections. It is understood that other types of sampling methods may also be applied.

Geometric Sampling

Geometric hyperprism sampling may be performed to generate an output model parameter set. In the present framework, it is feasible to apply geometric sampling, even if the original model parameter space has many dimensions and the forward model is very costly to compute, because the sampling and the forward evaluation steps are advantageously decoupled. Sampling may include different sparse sampling techniques, such as Latin hypercube sampling, Smolyak grids, random sampling or other schemes. In one implementation, the sampling domain is restricted by imposing different kinds of bounding and regularity constraints on the original model parameter space. Alternatively, or in combination with geometric sampling, oriented sampling may be performed by computing the Jacobian on the reduced base and using this information to orientate the sampling.

Bounded Constrained Sampling

In one implementation, geometric sampling includes bounded constrained sampling. Generally, this approach involves imposing lower and upper bounds (l, u) in the original model parameter space. To implement such bounding constraints, a search hyperprism may be circumscribed in the reduced base. The vertices of the search hyperprism represent the extrema of a region of allowable coefficients $a_k$ in the reduced base. The search hyperprism may be circumscribed by directly solving a vertex enumeration problem, or by other computationally feasible methods, such as axes projection, optimization or sparse random sampling.

Figure 11:
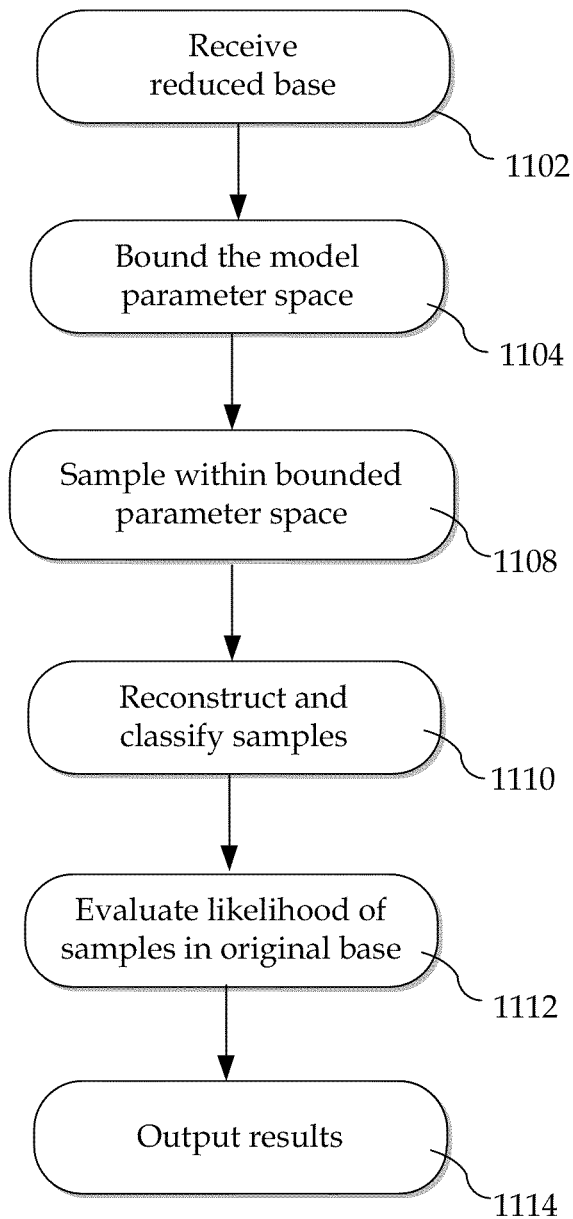
FIG. 11 shows an exemplary bounded constrained sampling method.

FIG. 11 shows an exemplary bounded constrained sampling method 206. At 1102, the reduced base is received. The reduced base may be a posterior or a prior reduced base. In one implementation, the reduced base is associated with a set of orthogonal vectors $v_k$. The reduced base may be generated by, for example, step 204 previously described with respect to FIGS. 2-10.

At 1104, the model parameter set m is bounded by lower and upper bounds (l, u) in the original model parameter space. The lower and upper bounds (l, u) may be defined based on the prior knowledge of the smallest and largest allowable or expected properties. By expanding the expression for a model parameter set $$m = \mu + \sum_{k=1}^{q} a_k v_k,$$

the bounding problem becomes finding the coefficients $a_k$ in the reduced base such as:

$$l - \mu \leq \sum_{k=1}^{q} a_k v_k \leq u - \mu. \quad (71)$$

where $\mu$ is the model mean, $a_k$ are real valued coefficients and $V_k$ are the vectors of the reduced base.

More particularly, the bounding constraints associated with the coefficients $a_k$ may be implemented by circumscribing a search hyperprism in the reduced base. The search hyperprism may be circumscribed by directly solving a vertex enumeration problem, which may include solving the linear upper and lower constrained problem expressed by the above-mentioned equation (71). The solution of the vertex enumeration problem generates a q-dimensional convex polytope in $R^q$, which defines the sampling search space. Once the vertices of the polytope are determined, it is possible to circumscribe a hyper-prism that contains all the coefficients $a_k$ to perform the geometric sampling.

The circumscribed hyperprism may also be determined without explicitly solving the vertex enumeration problem. In one implementation, the hyperprism is circumscribed by axes projection or coordinate search on each individual coefficient $a_k$. Axes projection may be performed by projecting upper and lower bounds (l, u) into the reduced space, as follows:

$$\min\left(\frac{\langle u, v_k \rangle}{\langle v_k, v_k \rangle}, \frac{\langle l, v_k \rangle}{\langle v_k, v_k \rangle}\right) \le a_k \le \max\left(\frac{\langle u, v_k \rangle}{\langle v_k, v_k \rangle}, \frac{\langle l, v_k \rangle}{\langle v_k, v_k \rangle}\right), \quad (72)$$
$$k = 1, \ldots, q$$

where $\langle \cdot, \cdot \rangle$ denotes the Euclidean scalar product in n-dimensional real space $R^n$. This generates a hyperprismatic search space in q-dimensional real space $R^q$ where the sampling is performed, q being much lower than n.

At 1108, sampling is performed within the bounded parameter space (e.g., circumscribed hyperprism and/or polytope) to generate the coefficients $a_k$. Various sampling procedures, such as the Latin hypercube sampling, sparse collocation grid sampling (e.g., Smolyak grids with Clenshaw-Curtis or Gaussian abscissas) or even random samplers, may be used for this purpose. Very sparse sampling methods are particularly useful in computationally expensive forward problems. More exhaustive sampling procedures (e.g., uniform sampling) may also be used where there are few dimensions and fast forward solvers.

Sampling may also be performed without first circumscribing the hyperprism and/or polytope. In one implementation, the coefficients $a_k$ are determined by sparse random sampling while imposing, at the same time, the bounding constraints (71). Sampling either with or without first circumscribing the hyperprism and/or polytope effectively decouples the sampling procedure from the forward evaluations.

At 1110, the resulting samples (i.e. coefficients $a_k$) are classified and selected according to, for example, the number of forward solves that can be achieved with the computational resources available. To reduce the computational cost, classification may be performed using clustering techniques in the reduced space before any forward evaluation. This procedure is particularly useful for very computationally expensive forward or inverse problems.

At 1112, the probability (or likelihood) of the samples in the original base is evaluated based on the misfit value and/or in accordance with the computational cost that may be assumed. For example, a uniform sampling distribution in the hyperprism induces a non-uniform prior distribution in the original space M, since:

$$P(m_i < c_i) = P\left(\sum_{k=1}^{q} a_k v_{ki} \le c_i - \mu_i\right). \quad (73)$$

where $m_i$ denotes the model parameter sets and $c_i$ denotes the model thresholds. This complete non-uniform distribution on M, the posterior, is not explicitly calculated, since only some independent samples are at disposal, whose number depends on the sparsity of the sampling scheme that has been used. However, once the coefficients $a_k$ are sampled over the reduced space, the approximation of this posterior may be determined by mapping these coefficients back to the original model space M. The same reasoning can be applied to the multivariate distributions of the model parameters.

In other implementations, additional constraints may be added to the model parameter space. For instance, a certain 2-point covariance function S(h) may be imposed by solving the following quadratic optimization problem:

$$\min\left\|\sum_{i,j=1}^{q} a_i a_j C_{ij}(h) - S(h)\right\|_2, \text{ where } C_{ij}(h) = E(v_i(x) v_i(x+h)). \quad (74)$$

Other types of constraints may also be added, such as in the oriented sampling approach, in which sampling is constrained to increase its efficiency.

At 1114, the results of the geometric sampling are returned. The results may include the generated samples (i.e. coefficients $a_k$) and the associated classification and probabilities in the original base. The sampling results after likelihood evaluation may be further processed by step 208 in FIG. 2, as will be described later.

Minimum Norm Geometric Sampling

Other types of geometric sampling approaches may also be used. These geometric sampling variants may be defined by how the reduced base vectors $v_k$ and the mean term μ are chosen. For example, minimum norm geometric sampling may be applied. In such case, the input model parameter set $m_0$ is computed using the Moore-Penrose pseudo inverse of the linearized problem. Accordingly, this model parameter set does not have components in the local null-space of the forward operator F. The uncertainties are determined by sampling in these directions.

In one implementation, the minimum norm geometric sampling method includes determining the minimum norm solution of the linearized problem, $m_{MN}$, and applying the model reduction techniques to $m_{MN}$ determining the terms of the reduced base. The Jacobian (in $m_{MN}$) may be computed in the reduced base, $JF_{(a_{MN})}$ by performing its singular value decomposition. Taking $\mu = m_{MN}$ geometric sampling may be performed using the reduced base vectors $v_k$ that span the null space of $JF_{(a_{MN})}$. Alternatively, it is also possible to consider the high frequency terms of reduced base that span $m_{MN}$ to perform the search.

Telescopic Geometric Sampling

Figure 12:
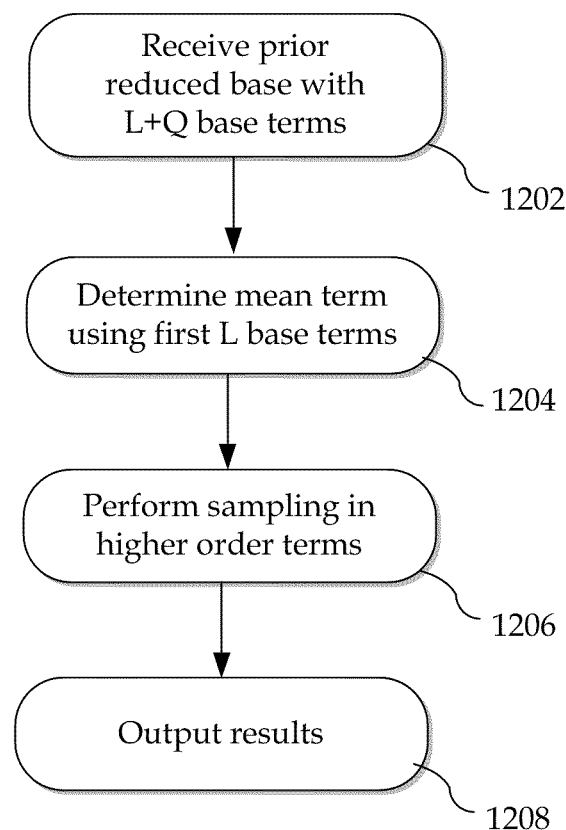
FIG. 12 shows an exemplary telescopic sampling method.

FIG. 12 shows an exemplary telescopic sampling method 206, which is another implementation of a geometric sampling-based method. Telescopic sampling is possible in the present framework, because of the orthogonal character of the reduced base that allows high frequencies may be added in the sampling as needed.

At 1202, the prior reduced base is received. The reduced base is associated with L+Q base terms. The reduced base terms may be computed by, for example, step 204 previously described with reference to FIGS. 2-10.

At 1204, the mean model term μ is determined using the first L base terms. The mean model term μ is the expansion of a "good" model parameter set using a certain number (L) of base terms:

$$\mu = \sum_{k=1}^{L} \alpha_k v_k.$$

At 1206, sampling is performed in the higher order coefficients $\{V_k\}_{k=L+1,Q}$. In other words, higher frequency terms are expanded and sampled, as follows:

$$l - \mu \le \sum_{k=L+1}^{Q} a_{jk} v_k \le u - \mu. \quad (75)$$

At 1208, the results of the sampling are output to be further processed by, for example, step 208 in FIG. 2, as will be described later.

Logarithmic Geometric Sampling

The present framework advantageously enables the use of other model parameterizations (e.g., logarithmic sampling) that facilitate better conditioning of the sampling procedure. In the case of model parameter sets having ranges in different orders of magnitude, the logarithmic parameterization helps to linearize the search. In addition, trade-offs between model parameter sets in a lot of cases are products and quotients, and these relationships become linear in the logarithmic space.

The logarithmic derivatives in the Jacobian and in the Hessian are as follows:

$$\frac{\partial d_i}{\partial \ln m_j} = m_j \frac{\partial d_i}{\partial m_j}, \tag{76}$$

$$\frac{\partial d_i^2}{\partial \ln m_j} = m_j \frac{\partial d_i}{\partial m_j} + m_j^2 \frac{\partial^2 d_i}{\partial^2 m_j}. \tag{77}$$

Thus, small sensitivities in the Jacobian $$\left(\frac{\partial d_i}{\partial m_j} \approx 0\right)$$

are scaled by the value of the model parameter sets $m_j$. The Hessian values are also scaled by $m_j^2$ and the additional term $$m_j \frac{\partial d_i}{\partial m_j}$$

(the sensibilities in the logarithmic base) is added to the second order derivatives. As mentioned previously, these two effects can help in some situations to linearize the nonlinear region of equivalence. This can be observed in 2 dimensions by transforming valley shapes.

In one implementation, the logarithmic reduced geometric sampling includes applying the model reduction technique to the logarithm of the model and performing the search on the logarithmic space. In such case, the bounds are in the logarithm space, and the Jacobian and the Hessian in the reduced space accounts for the logarithmic transformation using the chain rule, as stated above.

Oriented Sampling

Figure 13:
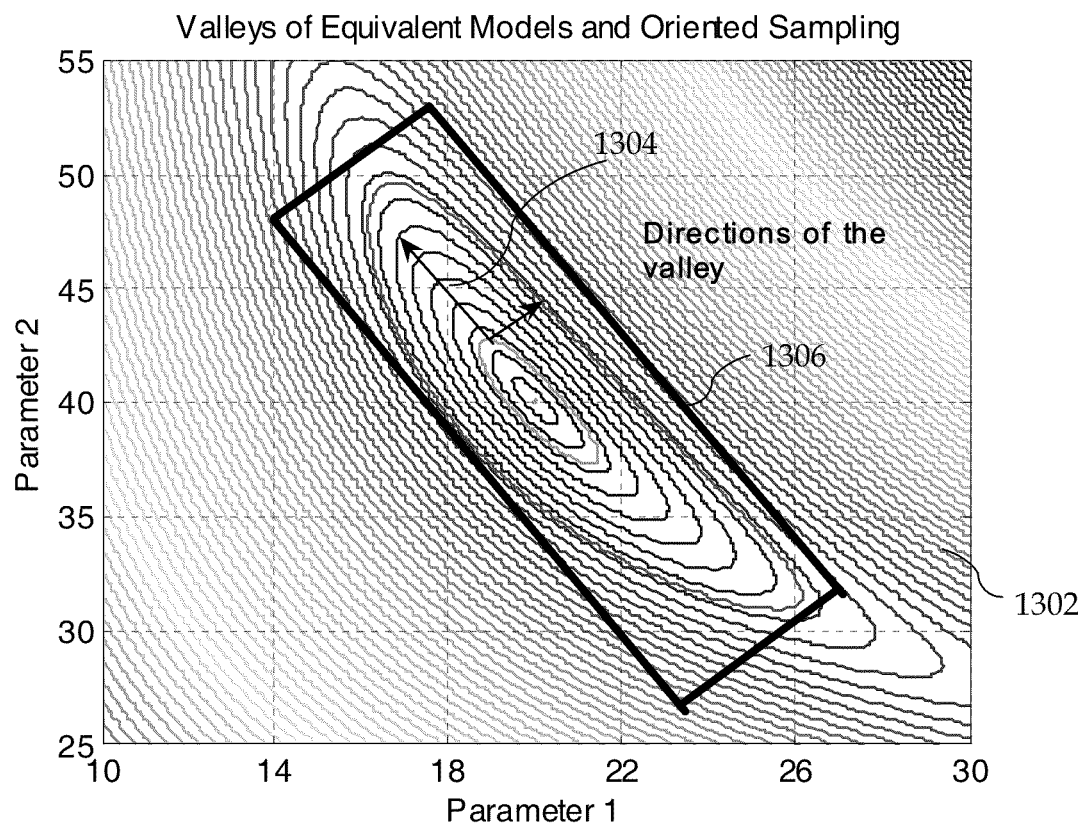
FIG. 13 shows an exemplary plot of the valleys of equivalent model parameters.

Oriented sampling may be performed alternatively or in combination with geometric sampling (at 206), and may also be viewed as a geometric sampling modality. In one implementation, oriented sampling is performed by computing the Jacobian of the forward operator F in the reduced base and using this information to orientate the sampling. For example, FIG. 13 shows a 2-dimensional plot 1302 of the valleys of equivalent model parameter sets. The Jacobian of the forward operator F in the reduced base provides the local directions 1304 of the valley 1306.

In one implementation, oriented sampling involves solving the quadratic problem of finding the coefficients $a_k$ expressed in the following exemplary relationship:

$$(a-a_0)^t JF_{a_0}{}^t JF_{a_0}(a-a_0) + 2\Delta d^t JF_{a_0}(a-a_0) + \|\Delta d\|_2^2 \leq \text{tol}^2. \tag{78}$$

Relationship (71) may be added as a constraint in the search if needed. In addition, the following approximation may be directly applied:

$$JF_{a_0}(a-a_0) \approx d - F(m_0). \tag{79}$$

This provides the additional constraint:

$$JF_{a_0}(a-a_0) \approx d - F(m_0), \tag{80}$$

that is, $$\sum_{k=1}^{q} a_k J_k \approx d - F(m_0) + JF_{a_0} a_0, \tag{81}$$

where $J_k$ are the column vectors of the Jacobian in the reduced base.

In one implementation, oriented geometric sampling is performed by adding the Jacobian-based constraint (78 or 81) to the geometric sampling approach expressed by, for example, relationship (71). The Jacobian-based constraint serves to restrict the polytope in the reduced space. In another implementation, oriented geometric sampling is performed by directly sampling on the $J_k$ base imposing $$l \leq \sum_{k=1}^{q} a_k J_k \leq u.$$

The logarithmic parameterization facilitates the linearization of the region of nonlinear equivalence, thereby enhancing the efficiency of the oriented sampling procedure. In addition, although the $J_k$ terms provide the local orientation of the valley, global bounds may be imposed to facilitate a global search along the valley.

Stochastic Sampling

Stochastic sampling may also be performed in the reduced base to generate an output model parameter sets. Stochastic sampling is particularly useful when the forward model is fast to compute. It may involve the use of optimization techniques such as Particle Swarm optimization (PSO), differential evolution, Monte Carlo methods, or a combination thereof.

Figure 14A:
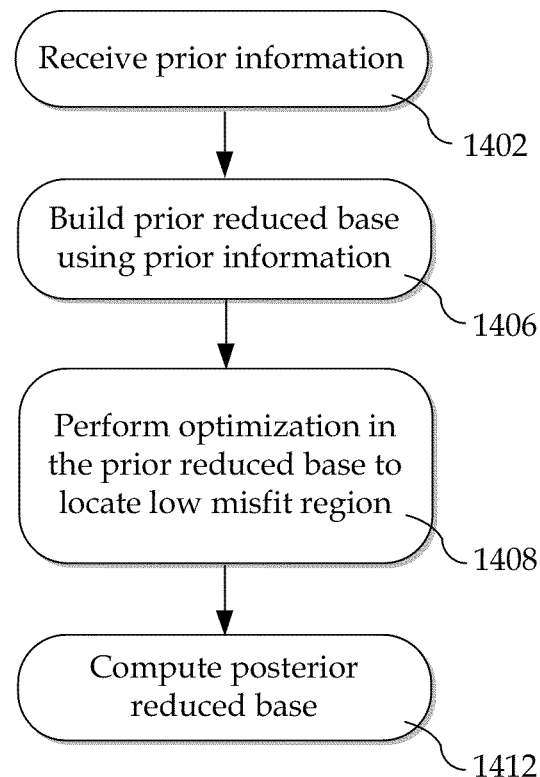
FIG. 14a shows an exemplary method of computing a posterior reduced base after optimization in a prior reduced base.
Figure 14B:
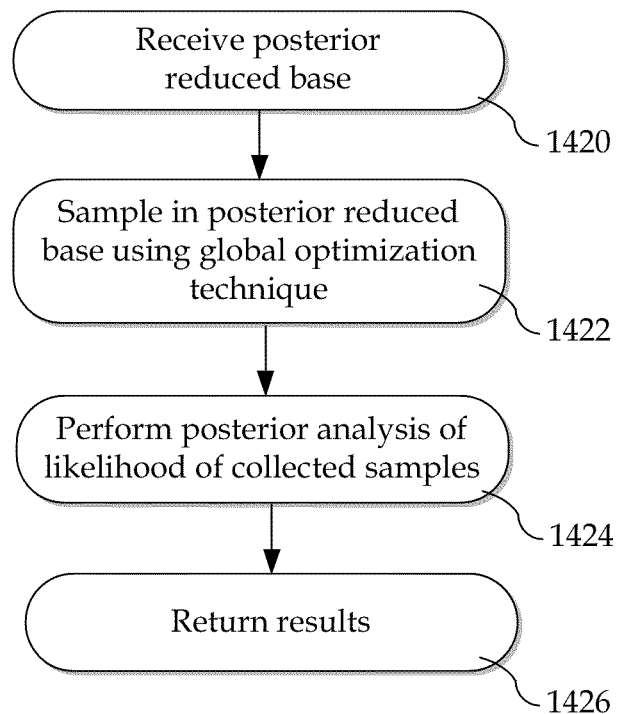
FIG. 14b shows an exemplary method of stochastic sampling in the posterior reduced base.

In one implementation, stochastic sampling is performed in a posterior reduced base. FIG. 14a shows an exemplary method 204 of computing the posterior reduced base, and FIG. 14b shows an exemplary method 206 of performing stochastic sampling in the posterior reduced base.

Referring to FIG. 14a, at 1402, prior information is received. Such prior information may include, for example, prior unconditioned scenarios (or different model parameters sets) that do not fit the observed data.

At 1406, the prior information is used to build a prior reduced base. In one implementation, the prior reduced base comprises a PCA base. The prior reduced base may be computed based on an ensemble of prior model parameter sets.

At 1408, optimization (or search) is performed in the prior reduced base until a valley of equivalent model parameter sets (or low misfit region) in the posterior is located. The optimization may be performed with any kind of regularization. In one implementation, particle swarm optimization (PSO) is performed. PSO may include using members of the PSO family with the highest convergence rate (e.g., regressive-regressive-PSO) until a good model parameter set $m_b$ in the valley of equivalent model sets is found. Other PSO family members or other optimization methods (e.g., differential evolution) may also be used.

At 1412, the posterior reduced base is computed. In one implementation, the posterior reduced base is determined by applying model reduction techniques using, as base model, $$m_b = \sum_{k=1}^{q} a_k v_k.$$

The model reduction techniques include, for example, SVD, DCT, DWT, DCHT, ICA or indicator base (IB).

FIG. 14*b* shows an exemplary stochastic method 206 that may be performed in the posterior reduced base. At 1420, the posterior reduced base is received. By switching to the posterior reduced base, more efficient sampling may be performed.

At 1422, sampling is performed in the posterior reduced base using a global optimization technique. This is particularly useful when the forward problem is fast to compute. Exemplary global optimization techniques include, for example, PSO (e.g., explorative versions such as centered-progressive-PSO), differential evolution (or sampling while optimization), or Monte Carlo methods (or importance sampling). Other types of global optimization methods may also be used. In these cases, the sampling and the forward evaluations are coupled. Some PSO family members (e.g., regressive-regressive-PSO, centered-centered-PSO and generalized PSO) have shown very impressive rates of convergence. Other PSO variants, such as centered-progressive (CP)-PSO, progressive-progressive (PP)-PSO and regressive-regressive (RR)-PSO, have also achieved good exploration of the search space.

When global optimization techniques are used to perform stochastic sampling, it may be important to control the diversity of the collected samples by maintaining an appropriate balance between exploration and exploitation. This may be achieved by monitoring the mean distance between the different parameter sets in each generation and their centers of gravity, and increasing the exploration if this distance is smaller than a certain cut-off value, which indicates that the generation has collapsed towards the same point.

At 1424, posterior analysis of the likelihood of collected samples is performed. For example, posterior statistics such as marginals, e-types, indicator maps, etc, may be generated based on the ensemble of output equivalent model parameter sets.

At 1426, the results of the stochastic sampling are returned for further processing by, for example, step 208 of FIG. 2.

Sampling while Optimizing Using the Reduced Base

Sampling may also be performed while optimizing in the reduced base. More particularly, local optimization and hyperquadric sampling in the reduced base may be iteratively performed until a stop criterion is fulfilled. Local optimization methods, such as Quasi-Newton methods (e.g., Gauss-Newton methods), may be performed to compute a moving local hyperquadric that circumscribes the sampling search space, by finding the minimum of the function $\|F(m)-d\|_2$ with a certain regularization that is built using prior information. The fact that the Jacobian and the Hessian of the cost function are easily computed in the reduced base has inspired the present method to optimize and sample in the reduced base.

In one implementation, the Gauss-Newton method is used to perform the local optimization. The Gauss-Newton method may be used to minimize a proxy of the function $\|F(m)-d\|_2$ using the first order approximation of F(m):

$$F(m) \approx F(m_0) + JF_{m_0}(m-m_0), \tag{82}$$

and then $$JF_{m_0}{}^t JF_{m_0}(m-m_0) = JF_{m_0}{}^t(F(m_0)-d).$$

(solved with regularization) (83)

The term $JF_{m_0}{}^t JF_{m_0}$ may be referred to as the linearized Hessian, because the second order terms have been removed in the first order approximation of F(m).

The approach may include evaluating the gradient and the Hessian of the cost function $C(m)=\|F(m)-d\|_2^2$ in a reduced base without explicitly acting over the Hessians of the component functions. This approach has the advantage of being numerically exact in the reduced base. The cost function C(m) may be expanded as follows:

$$C(m) = C(m_0) + \langle \nabla C_{(m_0)}, m-m_0 \rangle + \tag{84}$$
$$\frac{1}{2}(m-m_0)^t HC_{(m_0)}(m-m_0) + o(\|m-m_0\|_2^2),$$

where $m, m_0$ are model parameter sets expressed in the pixel base. Taking into account that $m=V \cdot a$, then the cost function in the reduced base becomes:

$$C(a) = C(a_0) + \langle \nabla C_{(a_0)}, a-a_0 \rangle + \tag{85}$$
$$\frac{1}{2}(a-a_0)^t HC_{(a_0)}(a-a_0) + o(\|a-a_0\|_2^2).$$

Figure 15:
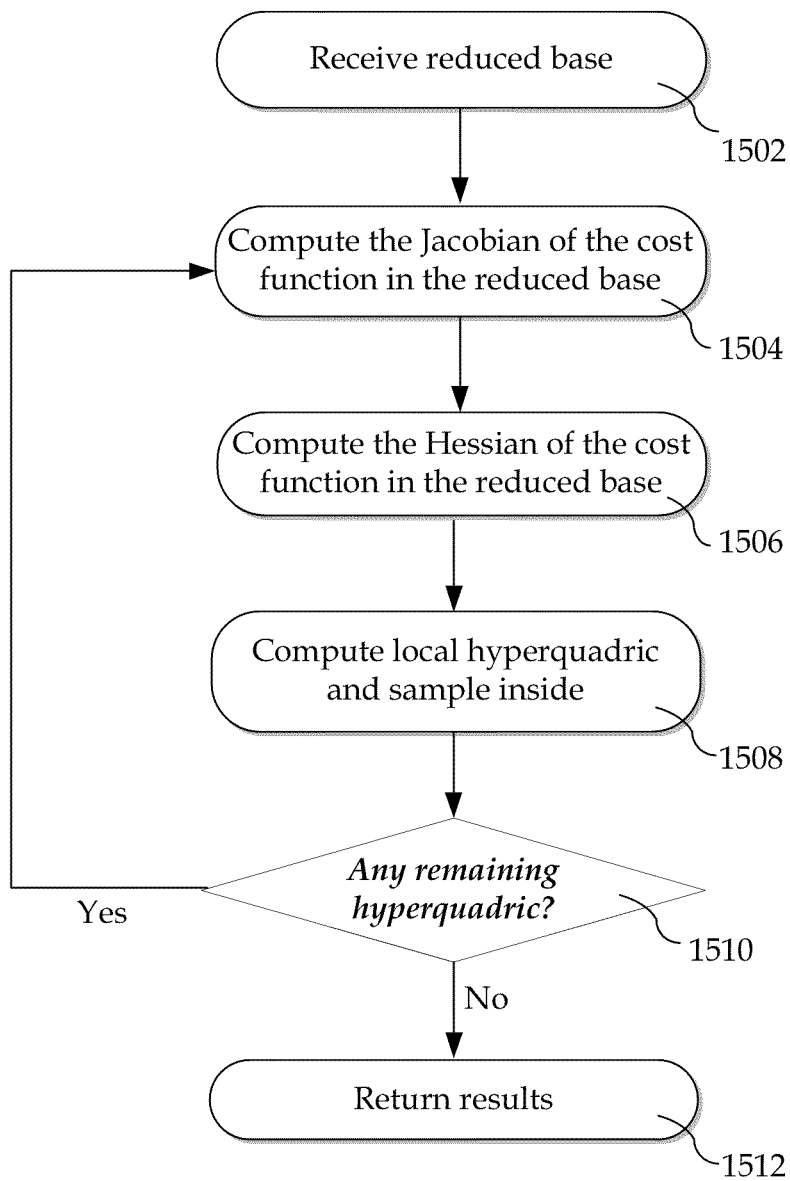
FIG. 15 shows an exemplary method of sampling while optimizing in the reduced base.

FIG. 15 illustrates an exemplary method 206 of sampling while optimizing in the reduced base in further detail. At 1502, a reduced base is received. The reduced base may be a posterior or a prior reduced base. A posterior reduced base, for example, may be generated based on a given input model parameter set $m_0$, as follows:

$$m_0 = \mu + \sum_{k=1}^{q} v_k = \mu + (1, \ldots, 1)_{\{v_1, v_2, \ldots, v_q\}} \ldots \tag{86}$$

At 1504, the Jacobian of the cost function C(m) is computed in the reduced base. The Jacobian (or gradient) $\nabla C_{(a_0)}$ (where $a_0 = (1, \ldots, 1)_{\{v_1, v_2, \ldots, v_q\}}$) may be computed as follows:

$$\nabla C_{(a_0)} = \left(\frac{\partial C}{\partial a_1}, \frac{\partial C}{\partial a_2}, \ldots \frac{\partial C}{\partial a_q}\right)_{a_0}, \tag{87}$$

and $$\left(\frac{\partial C}{\partial a_j}\right)_{a_0} \approx \frac{C(1, 1, \ldots, 1_j + \varepsilon, \ldots, 1) - C(1, 1, \ldots, 1_j, \ldots, 1)}{\varepsilon} \tag{88}$$

where $1_j$ represents the j-th component of the $a_0$ vector. This entitles the solution of q forward solves.

At 1506, the Hessian $HC_{(a_0)}$ may be defined as follows:

$$HC_{(a_0)}(i,j) = \frac{\partial^2 C}{\partial a_i \partial a_j} \tag{89}$$

$$= \frac{\partial}{\partial a_i}\left(\frac{\partial C}{\partial a_j}\right) \approx \frac{\frac{\partial C}{\partial a_j}(1,1,\ldots,1_i+\varepsilon,\ldots,1_q) - \frac{\partial C}{\partial a_j}(1,1,\ldots,1_i,\ldots,1_q)}{\varepsilon}.$$

Due to the symmetry of the Hessian $HC_{(a_0)}$, its calculation entitles the solution of $$\frac{q(q+1)}{2}$$

additional forward solves. In such case, a total of $$\frac{q(q+3)}{2}$$

forward solves may be needed.

At 1508, a local hyperquadric is computed (or circumscribed) by using the Hessian and sampling is performed within the hyperquadric by circumscribing an oriented hyperprism. As discussed previously, the local hyperquadric of equivalence may be expressed as follows:

$$\langle \nabla C_{(m_0)}, m\rangle + \frac{1}{2}m^t HC_{(m_0)}m - m_0^t HC_{(m_0)}m = \tag{90}$$

$$tol - C(m_0) + \langle \nabla C_{(m_0)}, m_0\rangle - \frac{1}{2}m_0^t HE_{(m_0)}m_0.$$

The center of the local hyperquadric is at the point $m_c = m_0 - HC_{(m_0)}^{-1}\nabla C_{(m_0)}$, which is computed by performing one iteration of the Gauss-Newton algorithm applied to the minimization of the cost function $C(m)$. In addition, the orientation of the hyperquadric may be contained in the V base of $HC_{(m_0)}) = V\Sigma V^t$.

The axes of the hyperquadric, rotated to the V base, are the inverse of the eigenvalues of the Hessian. The hyperquadric may be regularized by adding to the smallest eigenvalues a tolerance that is calculated in accordance with the ratio to the biggest eigenvalue. The hyperquadric may be sampled using, for example, sparse grids or any other sampling method. Calculations are performed in the reduced base.

At 1510, if there is any remaining hyperquadric to be processed, steps 1504-1508 are repeated. In particular, the center of the next hyperquadric is processed. Steps 1504-1508 are iteratively repeated until a predetermined stop criterion is fulfilled. Exemplary stop criteria are associated with, for example, error tolerance, the number of function evaluations, the number of sampled points, and so forth. During each iteration, the method 206 checks the value of the cost function in the centre of the new hyperquadric and at the extreme points with lowest eigenvalues (i.e. longer semi-axes) to decide in which direction the new search is to be performed.

In addition, the reduced base and Jacobian of the cost function at the center of the hyperquadric are recalculated. The Hessian may also be recalculated, in the reduced base, at the new center. Alternatively, the Hessian may be approximated using a numerical approximation method, such as a Quasi-Newton method (e.g., Davidon-Fletcher-Powell method (DFP), Broyden-Fletcher-Goldfarb-Shanno (BFGS) method, limited memory BFGS method (L-BFGS) or the Symmetric Rank 1 method (SR1)). All these methods have scalable formulae to calculate the inverse of the Hessian, which may be used to compute the center of the local hyperquadric.

At 1512, the results of the sampling (i.e. output model parameter sets) are output for further processing by, for example, step 208 of FIG. 2.

Figure 16:
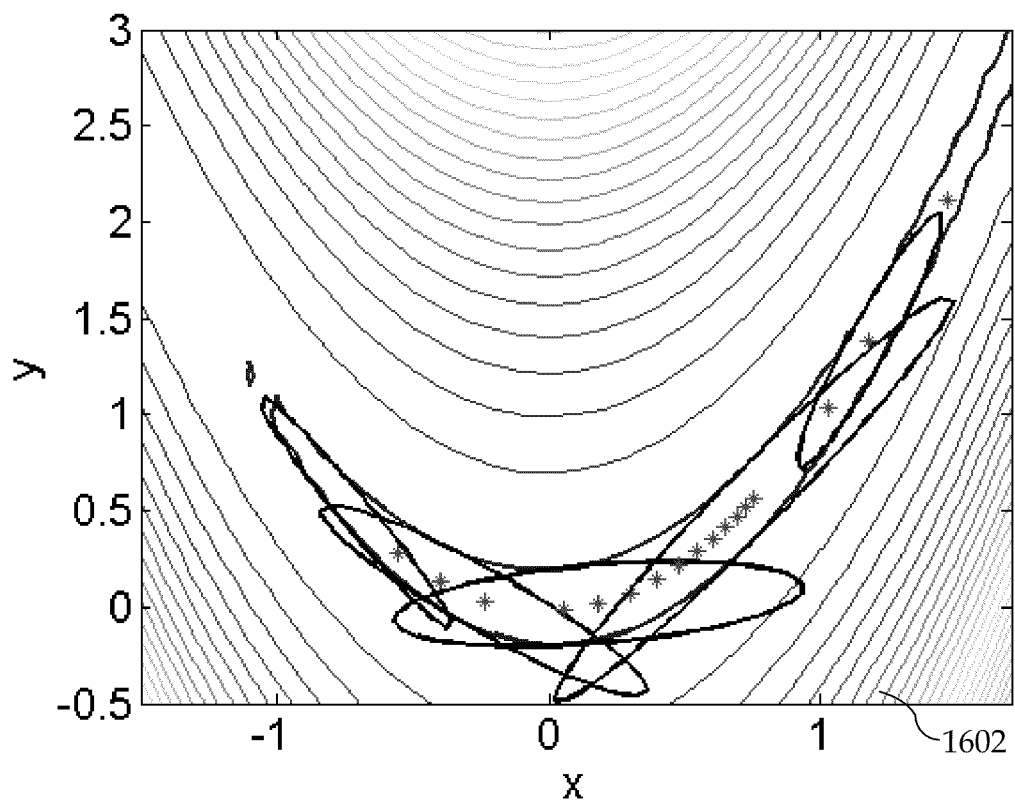
FIG. 16 shows a 2-D plot generated as a result of applying an exemplary method of sampling while optimizing for a valley shape.

FIG. 16 shows a 2-D plot 1602 illustrating this method for the Rosenbrock function, which is a synthetic benchmark function that has a valley shape. It is also known as the "banana" function. For sake of simplicity, the hyperprisms are not drawn.

Analysis of Output Model Parameter Sets

As discussed previously with reference to FIG. 2, the output model parameter sets are analyzed at 208 to generate one or more measures of interest. In one implementation, one or more uncertainty measures or probability maps are computed. Exemplary uncertainty measures include indicator maps, percentile maps or E-type values. It should be understood that other measures of interest may also be identified for further study.

Indicator maps may be generated by computing, at each pixel (i,j) of the model parameter set (m), the probability that the model parameter set is less than a certain cut-off c, as follows:

$$P(m(i,j)<c). \tag{91}$$

It is also possible to compute the probability of a certain property of the model parameter set:

$$P(\varnothing(m(i,j))<c). \tag{92}$$

It should be appreciated that other types of indicator maps may also be used.

In another implementation, percentile maps are generated by computing, at each pixel of the model parameter set (m), the p-percentile of the distribution of the values at this pixel deduced from the ensemble empirical distribution, as follows:

$$v(i,j):P(m(i,j)\leq p)=v(i,j). \tag{93}$$

The 50% percentile is the median, the 25% percentile is the lower-quartile, and the 75% percentile is the upper-quartile. Lower and upper spatial percentiles may be used to detect percentile anomalies.

In yet another implementation, E-type values are generated. E-types are the mean values (or the median) in each pixel deduced from the ensemble. Standard deviations and inter-quartile ranges may also be determined and interpreted as a measure of model variability (or uncertainty). In addition, based on the ensemble of posterior samples, it is also possible to analyze the linear trade-offs between the model parameter sets through their experimental covariance matrix, or to perform classification in the ensemble using clustering techniques to understand the families of models that have been sampled (i.e. multimodality).

INDUSTRIAL APPLICATIONS

Different techniques have been previously presented to build the reduced base for efficiently performing optimization and/or sampling with lower dimensionality. The choice of which technique to use depends on, for example, the size of the problem and how costly it is to solve each individual forward prediction. One major advantage of the present framework is its scalability to large size problems with very intensive forward solvers. This is made possible because the sampling can be decoupled from the forward evaluation by using the reduced geometric sampling approach. In addition, before likelihood evaluation, it is also possible to perform a cluster procedure to classify the samples and reduce the computational burden. Another major advantage of the present framework is that it can be applied to a broad range of applications solving various kinds of inverse and scalar optimization problems, because it does not rely on the forward model F of the predetermined problem.

One exemplary application is exploration geophysics, which can be used in the petroleum and mining exploration and/or production industry. Exploration geophysics involves a set of techniques that map the subsurface structure of a region to elucidate the underlying structures, spatial distribution of rock units, and to assess the likelihood of ore deposits or hydrocarbon accumulations. These techniques include, but are not limited to, seismic reflection techniques, gravimetric, magnetic or electromagnetic methods, electrical methods and tomography techniques.

More particularly, seismic reflection techniques may be used to map the subsurface distribution and structure of terrains so as to delineate potential hydrocarbon accumulations. In a process known as seismic inversion, the seismic reflection data can be transformed into a quantitative rock property description of a reservoir. Such techniques are important in tomography methods that try to unravel the velocity structure and elastic parameters of the terrains. Gravimetric, magnetic and electromagnetic methods are also very important in mineral exploration and in facilitating the delineation of the hydrocarbon reservoirs in oil and gas exploration. For instance, magneto-telluric and controlled-source electromagnetic (CSEM) data can be used to detect resistivity changes, complementing seismic data to detect hydrocarbons. In addition, electrical methods, such as electrical resistivity tomography, induced polarization and spontaneous potential methods can be employed in geothermal studies, hydrogeology and environment.

Tomography methods in these disciplines are used in borehole geophysics to monitor oil and gas production, as well as to gain knowledge about reservoir heterogeneities so as to assess and optimize oil production and recovery. These geophysical techniques may also be employed in quantitative hydrogeology, mining exploration and environmental studies, such as monitoring carbon dioxide injections in reservoirs to help prevent climate change. In such methods, uncertainty arises due to, for example, partial coverage (e.g., data survey is on the surface of the earth) and noise introduced during data acquisition (e.g., instrumental noise, error in location of sources and receivers, etc.). The present framework may be used to efficiently and accurately estimate the uncertainty of the data for this broad range of technological applications.

Another exemplary application of the present framework is reservoir simulation and optimization. Reservoir simulation is an area of reservoir engineering in which computer models are used to predict the flow of fluids (e.g., oil, water, and gas) through porous media. Reservoir simulation models are used by oil and gas companies in the development of new fields, and to make production forecasts for investment decision-making for developed fields. Such models may be used to identify the number of wells required for exploiting a new field and to manage the way that the reservoir is going to be produced to improve oil recovery: hydraulic fracturing, deviated wells, water and gas reinjection, etc. Other reservoir simulation applications include solving history matching inverse problems, which try to improve the knowledge of the reservoir properties by reproducing its past behavior (e.g., historical production or pressures). Once a model parameter set (or a family of model parameter sets) has been historically matched, it can be used to simulate future reservoir behaviour with a higher degree of confidence. Other applications include well placement and net present value optimizations. In these applications, the model parameters include, for example, permeability, porosity or saturation. Similar applications may also be found in the hydrogeology field.

Additionally, the present framework may be applied in the fields of biomedical applications, financial analysis, and meteorology predictions. For example, in the biomedical field, the present framework may be used to determine the uncertainty associated with data acquired by various imaging modalities, such as computed tomography (CT), electrical impedance tomography, optical tomography, magnetic resonance imaging, etc. In another exemplary application, the present framework may be applied to estimate the uncertainty of a diagnostic conclusion determined by a predictive model. Other biomedical applications include probabilistic image segmentation in medical imaging and diagnosis, electromagnetic inverse scattering problem for cancer detection, classification and prediction of biomedical microarrays (e.g., proteins, cellular structures), data mining, biomolecular structural predictions, drug design, and so forth.

In the field of financial analysis, the present framework may be used to predict financial markets, optimize portfolios, assess and manage risk, and generally to analyze investments by simulating the various sources of uncertainty affecting their value, and then determining their average value over the range of resultant outcomes. As for the field of meteorology, the present framework may be used in weather forecasting and numerical weather prediction, contamination dispersion and air quality models, etc. Other technological applications include, but are not limited to, optimizing processes in food industry, structural optimization, material design and nanotechnology, semiconductor design, chemometrics, power and electrical industries, network design, etc.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A method of analyzing data in high-dimensional space, comprising:
    (i) receiving, by a processor, observed data from a data source and at least one input model parameter set serving as a pre-determined solution candidate of a pre-defined problem, wherein the input model parameter set is related to the observed data via a prediction model;
    (ii) transforming, by the processor, the prediction model space associated with the input model parameter set into a reduced base, wherein the reduced base is associated with a set of coefficients that represents coordinates of any model parameter set in the reduced base, and the coefficients in the reduced base are fewer than model parameters in the input model parameter set; and
    (iii) sampling within the reduced base, by the processor, to generate a first output model parameter set in the reduced base, and reconstructing the first output model parameter set to generate a second output model parameter set in the prediction model space, wherein the second output model parameter set is compatible with the input model parameter set and fits the observed data, via the prediction model, within a predetermined threshold.

2. The method of claim 1 wherein the reduced base comprises a target oriented base.

3. The method of claim 2 wherein the step (ii) comprises determining the target oriented base by applying a learning, interpolation, or conditional simulation technique on one or more secondary attributes, hard model information or a combination thereof.

4. The method of claim 1 wherein the input model parameter set comprises a unique posterior model parameter set.

5. The method of claim 4 wherein the step (ii) comprises orthogonally transforming the posterior model parameter set to determine a posterior reduced base.

6. The method of claim 5 wherein the orthogonally transforming the posterior model parameter set comprises:
generating one or more orthogonal transformation matrices by performing a model reduction method;
projecting the posterior model parameter set onto at least one of the one or more orthogonal transformation matrices to generate one or more compressed terms; and
projecting the one or more compressed terms back onto an original canonical base associated with the posterior model parameter set to generate the posterior reduced base.

7. The method of claim 6 further comprises performing, on the one or more compressed terms, exact compression, group compression, or any combination thereof.

8. The method of claim 6 wherein the model reduction method comprises singular value decomposition, discrete cosine transform, discrete wavelet transform, discrete Chebyshev transform or independent component analysis.

9. The method of claim 5 wherein the posterior reduced base comprises a spatial indicator base.

10. The method of claim 1 wherein the step (iii) comprises hyperprism sampling, minimum norm geometric sampling, telescopic geometric sampling or logarithmic geometric sampling.

11. The method of claim 1 wherein the step (iii) comprises oriented sampling.

12. The method of claim 1 wherein the step (iii) comprises stochastic sampling.

13. The method of claim 12 wherein the step (ii) comprises:
receiving prior information;
determining a prior reduced base using the prior information;
performing optimization in the prior reduced base to locate a low misfit region; and
determining a posterior reduced base based on a good model of the low misfit region.

14. The method of claim 13 wherein the optimization comprises particle swarm optimization, differential evolution, Monte Carlo methods, or any combination thereof.

15. The method of claim 13 wherein the stochastic sampling comprises:
receiving a posterior reduced base; and
sampling in the posterior reduced base using a global optimization technique.

16. The method of claim 15 wherein the global optimization technique comprises particle swarm optimization, differential evolution, Monte Carlo methods, or a combination thereof.

17. The method of claim 1 wherein the step (iii) further comprises iteratively performing local optimization and hyperquadric sampling in the reduced base.

18. A system for determining uncertainty in high-dimensional data space, comprising:
a data source for storing digital observed data;
a computer system communicatively coupled to the data source to receive the digital observed data, the computer system including a memory device for storing computer readable program code and a processor in communication with the memory device, the processor being operative with the computer readable program code to:
(i) receive the digital observed data and at least one input model parameter set serving as a pre-determined solution candidate of a predefined problem, wherein the input model parameter set is related to the digital observed data via a prediction model;
(ii) transforming the prediction model space associated with the input model parameter set into a reduced base, wherein the reduced base is associated with a set of coefficients that represents coordinates of any model parameter set in the reduced base, and the coefficients in the reduced base are fewer than model parameters in the input model parameter set;
(iii) sample within the reduced base to generate a first output model parameter set in the reduced base, and reconstructing the first output model parameter set to generate a second output model parameter set in the prediction model space, wherein the second output model parameter set is compatible with the input model parameter set and fits the digital observed data, via the prediction model, within a predetermined threshold; and
(iv) generate one or more uncertainty measures based on the second output model parameter set.

19. The system of claim 18 wherein the data source comprises a data acquisition system operable to digitize observations of a physical system.

20. The system of claim 18 wherein the digital observed data comprises geophysical data, historical production data, pressure data, meteorological data, electrophysiological data, biomedical data or financial data.

* * * * *